(12) United States Patent  (10) Patent No.: US 7,411,642 B2
Takizawa et al.  (45) Date of Patent: Aug. 12, 2008

(54) COLOR FILTER SUBSTRATE AND ELECTRO-OPTICAL DEVICE, MANUFACTURING METHOD FOR COLOR FILTER SUBSTRATE AND MANUFACTURING METHOD FOR ELECTRO-OPTICAL DEVICE, AND ELECTRONIC EQUIPMENT

(75) Inventors: Keiji Takizawa, Hotaka (JP); Tomoyuki Nakano, Toyoshina (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/789,143

(22) Filed: Apr. 24, 2007

(65) Prior Publication Data
US 2007/0195242 A1 Aug. 23, 2007

Related U.S. Application Data

(62) Division of application No. 10/194,915, filed on Jul. 12, 2002, now Pat. No. 7,227,600.

(30) Foreign Application Priority Data
Jul. 13, 2001 (JP) ............................. 2001-213426
Jun. 14, 2002 (JP) ............................. 2002-174962

(51) Int. Cl.
*G02F 1/1335* (2006.01)
(52) U.S. Cl. ...................................... 349/106; 349/114
(58) Field of Classification Search ................. 349/114, 349/106, 110, 139, 113, 112, 138
See application file for complete search history.

(56) References Cited

U.S. PATENT DOCUMENTS

| 6,281,952 | B1 | 8/2001 | Okamoto et al. | |
| 6,452,654 | B2 * | 9/2002 | Kubo et al. | 349/114 |
| 6,476,889 | B2 | 11/2002 | Urabe et al. | |
| 6,600,536 | B1 | 7/2003 | Kuwabara et al. | |
| 6,657,687 | B2 | 12/2003 | Takizawa | |
| 6,690,438 | B2 * | 2/2004 | Sekiguchi | 349/114 |
| 6,697,135 | B1 | 2/2004 | Baek et al. | |
| 6,731,359 | B1 | 5/2004 | Fukaya | |
| 2005/0002686 | A1 | 1/2005 | Saitoh et al. | |

FOREIGN PATENT DOCUMENTS

JP  09-113890  5/1997

(Continued)

OTHER PUBLICATIONS

Communications from Japanese Patent Office regarding related applications.

*Primary Examiner*—Thoi V Duong
(74) *Attorney, Agent, or Firm*—Harness, Dickey & Pierce, P.L.C.

(57) ABSTRACT

To provide a color filter substrate and transflective type electro-optical device capable of ensuring both brightness of reflective display and saturation of transmissive display. Also, to reduce the difference in color between reflective display and transmissive display. A reflective layer 211 having openings 211a is formed on a substrate 201, and subsequently, a transmissive layer 214 is partially formed, and upon these is formed a color filter 212 having colored layers 212r, 212g, and 212b. Thick portions 212TH provided to non-formation regions of the transmissive layer 214 are formed to the colored layer.

13 Claims, 22 Drawing Sheets

FOREIGN PATENT DOCUMENTS

| | | |
|---|---|---|
| JP | 11-52366 | 2/1999 |
| JP | 11-183915 | 7/1999 |
| JP | 11-242226 | 9/1999 |
| JP | 11-295518 | 10/1999 |
| JP | 2000-180624 | 6/2000 |
| JP | 2000-267077 | 9/2000 |
| JP | 2000-267081 | 9/2000 |
| JP | 2000-284275 | 10/2000 |
| JP | 2000-298271 | 10/2000 |
| JP | 2001-033778 | 2/2001 |
| JP | 2001-125094 | 5/2001 |
| JP | 2001-142063 | 5/2001 |
| JP | 2001-166289 | 6/2001 |
| JP | 2002-365422 | 12/2002 |

* cited by examiner

FIG. 8
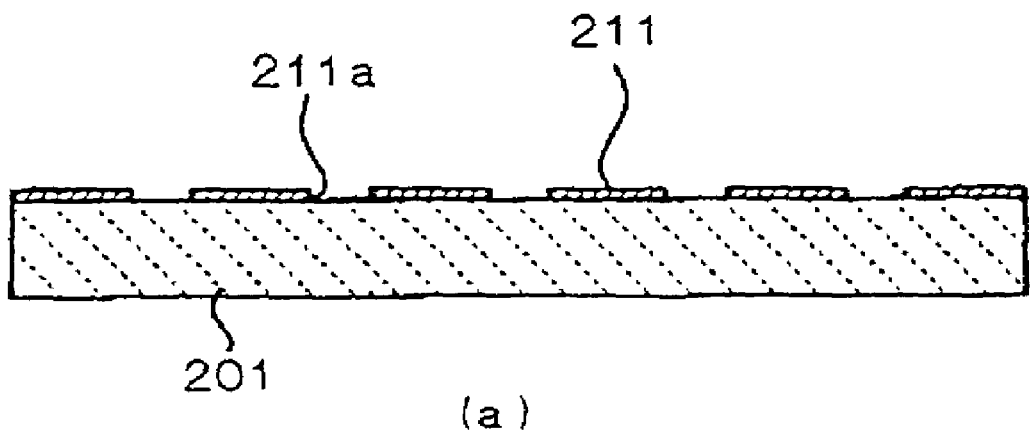
(a)
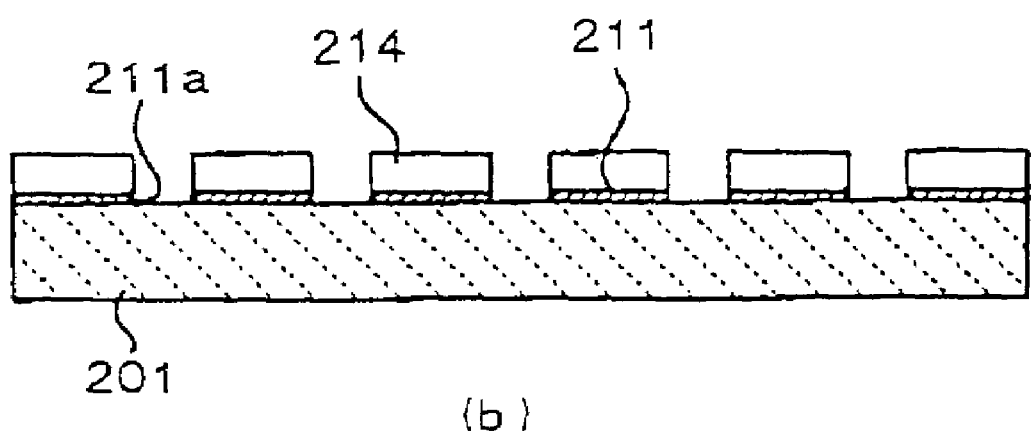
(b)
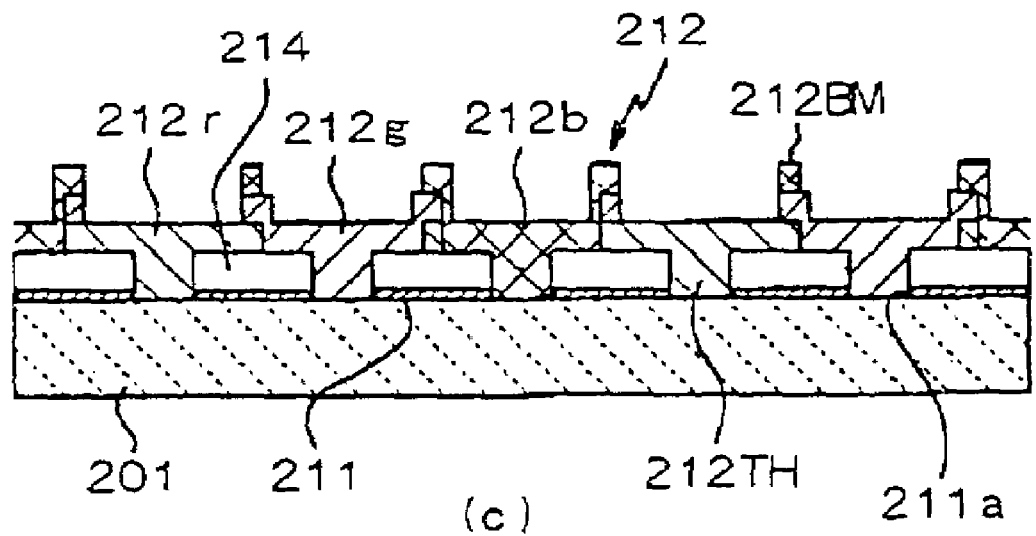
(c)

FIG. 9
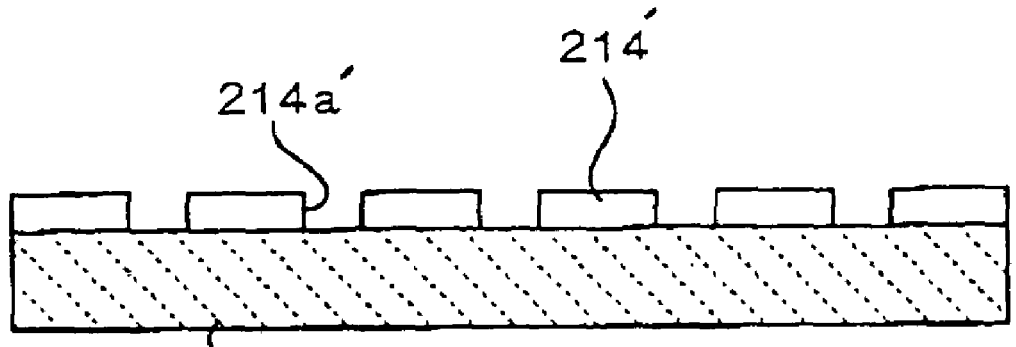
(a)
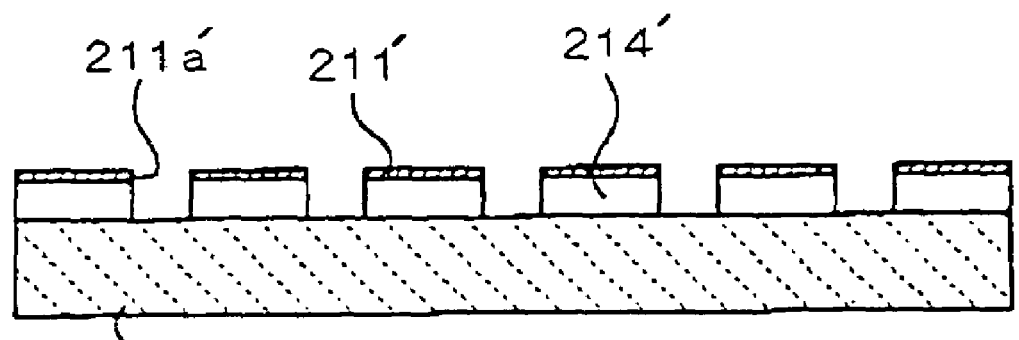
(b)
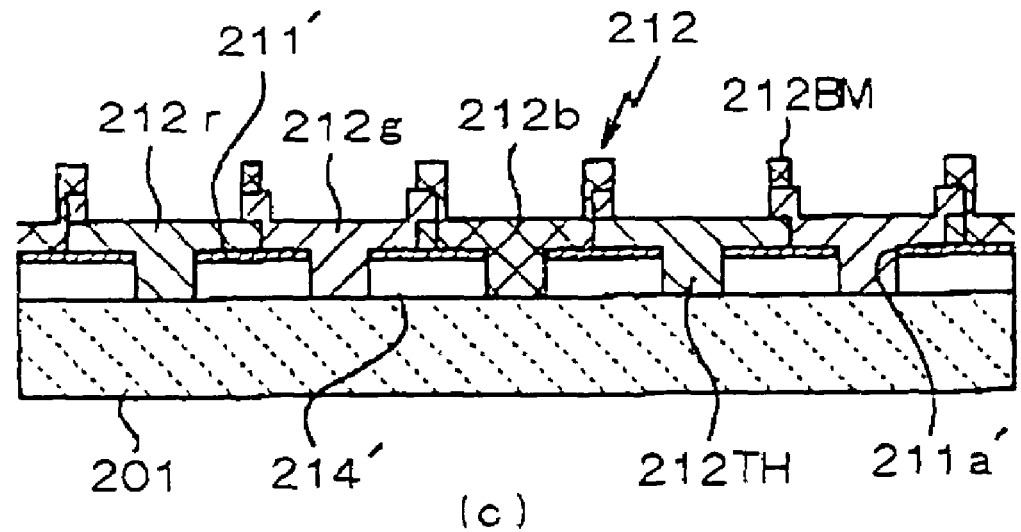
(c)

FIG. 10
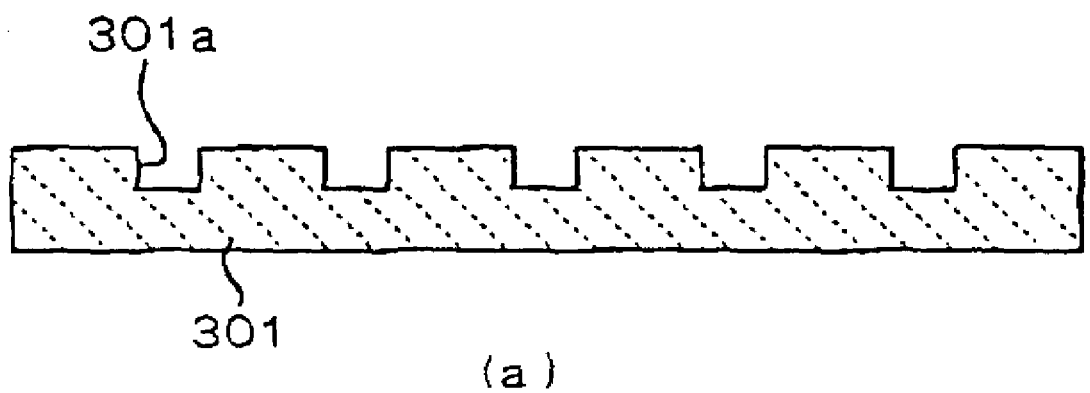
(a)
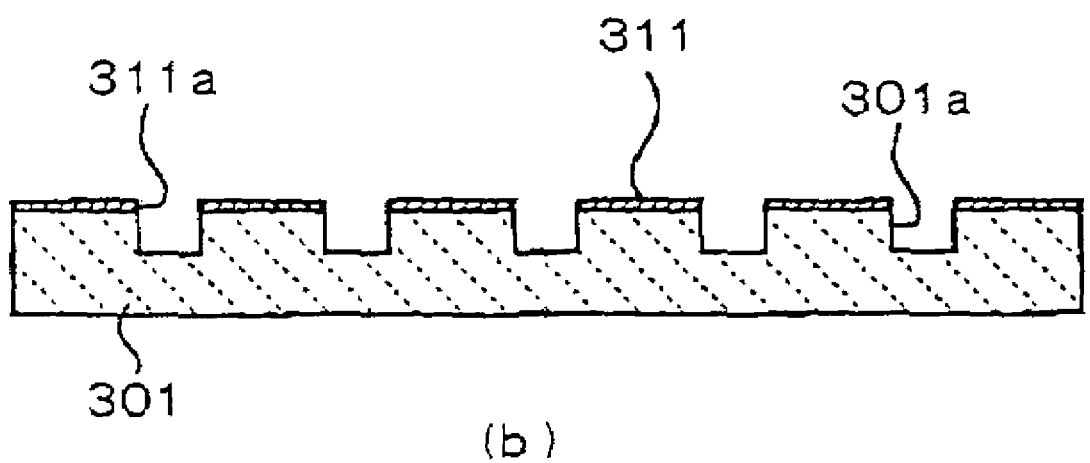
(b)
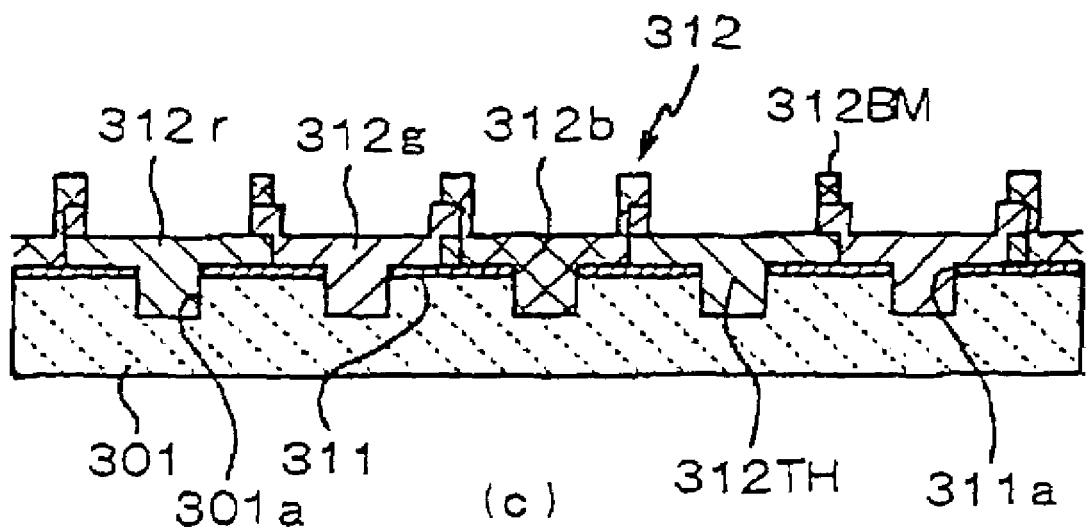
(c)

FIG. 11
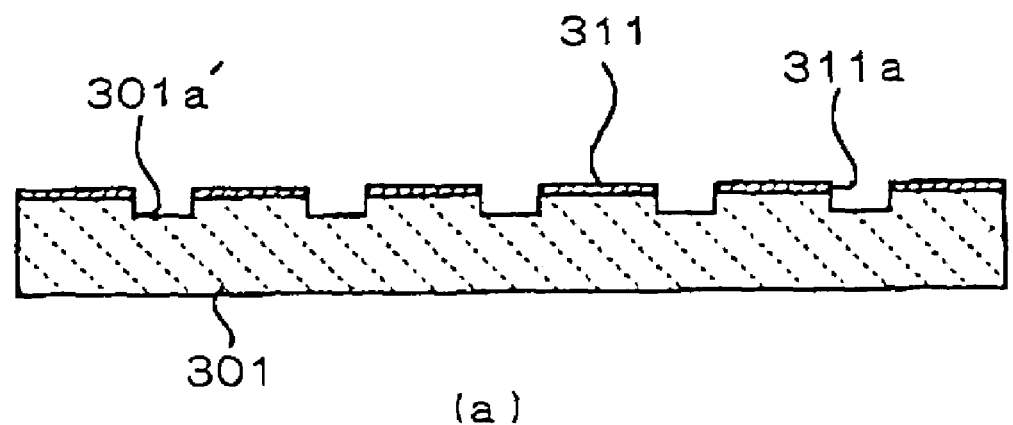
(a)
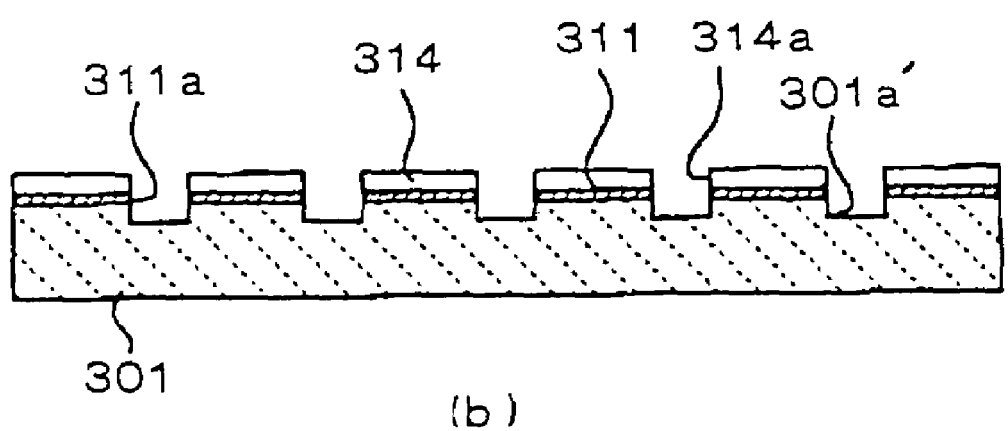
(b)
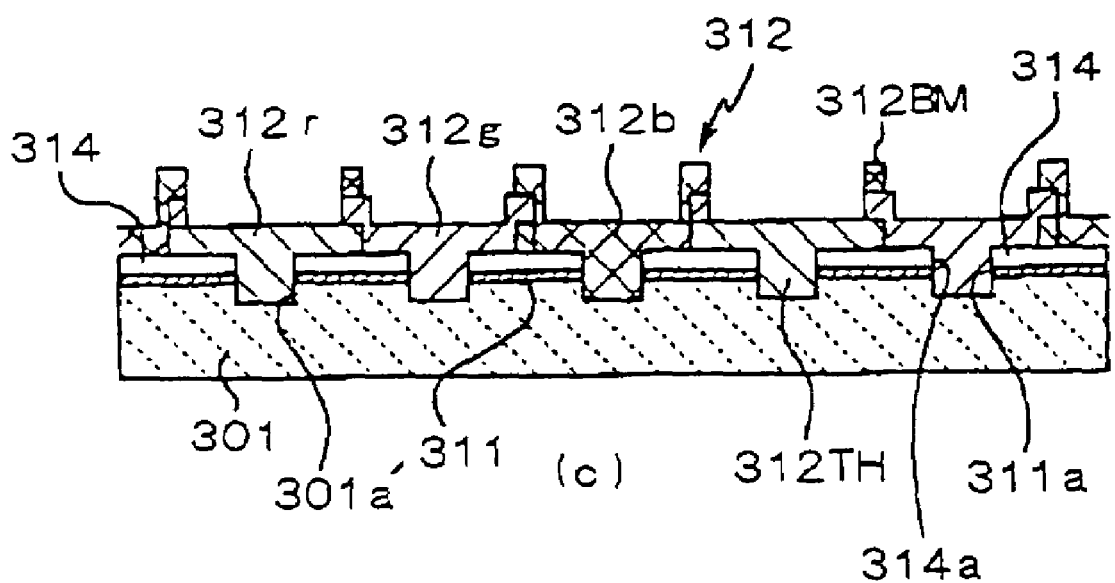
(c)

FIG. 12
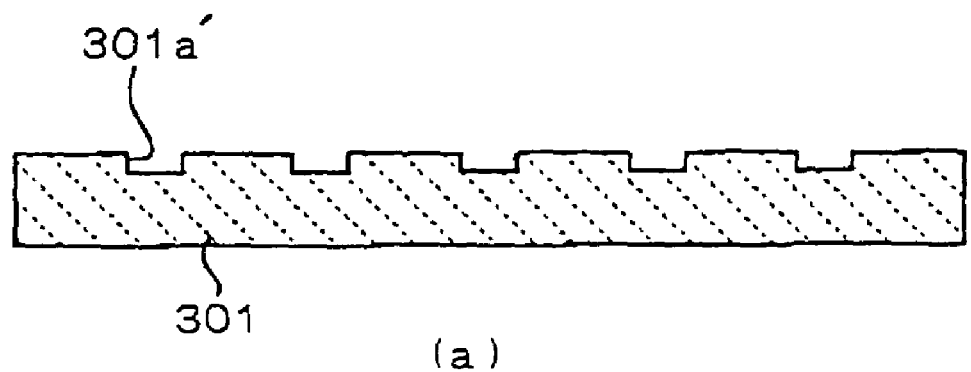
(a)
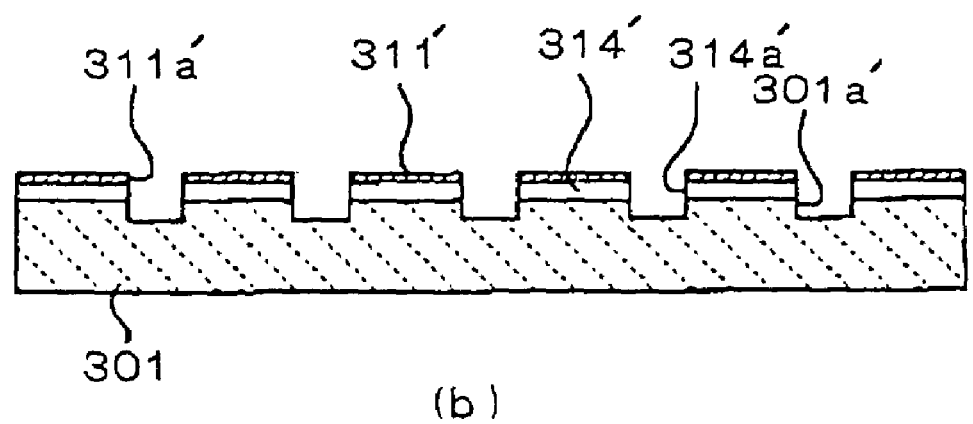
(b)
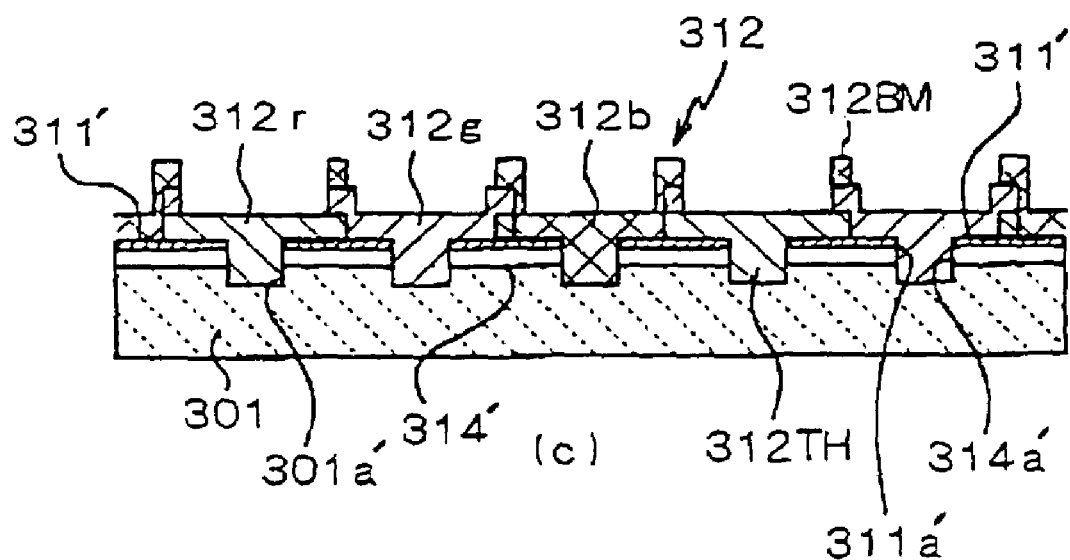
(c)

COLOR FILTER SUBSTRATE AND ELECTRO-OPTICAL DEVICE, MANUFACTURING METHOD FOR COLOR FILTER SUBSTRATE AND MANUFACTURING METHOD FOR ELECTRO-OPTICAL DEVICE, AND ELECTRONIC EQUIPMENT

CROSS REFERENCE TO RELATED APPLICATIONS

This application is a divisional patent application of U.S. Ser. No. 10/194,915 filed Jul. 12, 2002, now U.S. Pat. No. 7,227,600 claiming priority to Japanese Patent Application Nos. 2001-213426 filed Jul. 13, 2001 and 2002-174962 filed Jun. 14, 2002, all of which are hereby incorporated by reference in their entirety.

BACKGROUND OF THE INVENTION

1. Technical Field

The present invention relates to a color filter substrate and an electro-optical device, and a manufacturing method for a color filter substrate and a manufacturing method for an electro-optical device, and particularly relates to a structure of a color filter suitably used with a transflective electro-optical device.

2. Background Art

Conventionally, transflective liquid crystal display panels enabling visualization of both reflective display using external light and transmissive display using illumination light from a back-light or the like, have been known. Such transflective liquid crystal display panels comprise a reflective layer for reflecting external light into the panel, and are configured so that illumination light from a back-light or the like can transmit through the reflective layer. As for this type of reflective layer, there are those having patterns with openings (slits) at a predetermined ratio for each pixel of the liquid crystal display panel.

FIG. 19 is a schematic cross sectional diagram illustrating the schematic configuration of a conventional transflective liquid crystal display panel 100 in model fashion. This liquid crystal display panel 100 has a configuration wherein a substrate 101 and a substrate 102 are adhered one to another by a seal material 103, with liquid crystal 104 being sealed in between the substrate 101 and the substrate 102.

A reflective layer 111 having openings 111a for each pixel is formed on the inner face of the substrate 101, and a color filter 112 having colored layers 112r, 112g, and 112b, and a protective layer 112p, are formed on this reflective layer 111. Transparent electrodes 113 are formed on the surface of the protective layer 112p of the color filter 112.

On the other hand, a transparent electrodes 121 are formed on the inner face of the substrate 102, so as to intersect with the transparent electrodes 113 on the opposing substrate 101. Now, alignment film, hard transmissive film, etc., is formed on the transparent electrodes 113 on the substrate 101 and the transparent electrodes 121 on the substrate 102 as necessary.

Also, a phase difference plate (¼ wavelength plate) 105 and polarizing plate 106 are sequentially disposed out-of-plane on the substrate 102, and a phase difference plate (¼ wavelength plate) 107 and polarizing plate 108 are sequentially disposed out-of-plane on the substrate 101.

The liquid crystal display panel 100 configured thus is attached in the state of a back-light 109 disposed at the rear side thereof in the event of being installed in electronic equipment such as cellular telephones, portable information terminals, and the like. With this liquid crystal display panel 100, external light is transmitted through the liquid crystal 104 following the reflection path R in daytime or in bright places such as indoors and is reflected on the reflective layer 111, and transmits through the liquid crystal 104 again and is discharged, so reflective display is visually recognized. On the other hand, the back-light 109 is lit at nighttime or dark places such as outdoors, whereby the illumination light of the back-light 109 which has transmitted through the openings 111a is transmitted through the liquid crystal display panel 100 following the transmission path T and is discharged, so transmissive display is visually recognized.

SUMMARY OF THE INVENTION

However, with the above-described conventional transflective liquid crystal display panel 100, the light passes through the color filter 112 twice, coming and going, with the reflection path R, while the light only passes through the color filter 112 once with the transmissive path T, so there is the problem that the saturation deteriorates for transmissive display as compared to the saturation for reflective display. That is to say, with reflective display, the brightness of the display generally tends to be insufficient, so there is the need to set the light transmissivity of the color filter 112 high to secure brightness for the display, but this means that sufficient saturation cannot be obtained for transmissive display.

Also, the number of times of light passing through the color filter differs between reflective display and transmissive display as mentioned above, so the color of the reflective display and the color of the transmissive display greatly differ, and accordingly there is the problem that this presents an uncomfortable sensation.

Accordingly, the present invention has been made to solve the above problems, and it is an object thereof to provide a color filter substrate capable of securing both brightness for reflective display and saturation for transmissive display in the event of application to a display device capable of both reflective display and transmissive display. It is another object to provide a transflective electro-optical device capable of securing both brightness for reflective display and saturation for transmissive display. It is still another object to realize display technology capable of reducing difference of saturation between reflective display and transmissive display.

In order to solve the above problems, a color filter substrate according to the present invention comprises: a substrate; a reflective layer disposed on the substrate, and having a transmitting portion essentially capable of transmitting light; and a colored layer disposed so as to overlay at least the reflective layer in a planar manner, and having a thick portion; wherein the reflective layer has a reflecting portion on the perimeter of the transmitting portion; wherein the thick portion is disposed so as to overlay the transmitting portion in a planar manner; and wherein the thickness of the thick portion is greater than the sum of the thickness of a portion of the colored layer corresponding to the reflecting portion position and the thickness of the reflecting portion.

According to the present invention, a thick portion, with thickness greater than the sum of the thickness of a portion of the colored layer corresponding to the reflecting portion position and the thickness of the reflecting portion, is provided so as to overlay the transmitting portion of the reflective layer in planar fashion, whereby the saturation of the transmitting light transmitted through the transmitting portion of the reflective layer can be increased more than with the conventional.

Now, the transmitting portion of the reflective layer is essentially capable of transmitting light, and a transmitting portion may be formed by providing an opening in part of the reflective layer, or a transmitting portion may be formed by forming a part of the reflective layer thinner.

Now, the transmitting portion is an opening provided in the reflective layer, and preferably comprises a transmissive layer essentially capable of transmitting light between the reflective layer excluding the opening, and the colored layer. Having a transmissive layer formed between the reflective layer and the colored layer allows a configuration wherein a step exists between the opening of the reflective layer and the transmissive layer, and a thick portion can be readily formed by forming a colored layer on this step. Also, the surface of the colored layer can be formed smoothly even in the event of forming a thick portion, due to the existence of the step.

Also, the transmissive layer preferably has scattering functions for scattering light. Thus, blinding from illumination light or sunlight due to regular reflection of the reflective layer, picking up surrounding scenery, etc., can be reduced in cases of visually recognizing the reflective display through the color filter substrate.

Further, the transmitting portion is preferably an opening provided to the reflective layer, having a foundation layer between the reflective layer excluding the opening and the substrate. Due to a foundation layer being formed between the reflective layer and the substrate, the configuration can be made such that a step exists between the opening at the reflective layer and the reflective face raised up by the foundation layer, and the thick portion can be readily provided by forming a colored layer on this step.

Also, the surface of the colored layer can be formed smoothly even in the event of forming a thick portion, due to the existence of the step.

Also, the surface of the foundation layer preferably has patterned indentations, and the reflective layer has minute patterned indentations for scattering light. Thus, blinding from illumination light or sunlight due to regular reflection of the reflective layer, picking up surrounding scenery, etc., can be reduced in cases of visually recognizing the reflective display thorough the color filter substrate.

Further, preferably, the substrate has a recessed portion, and the thick portion is disposed so as to overlay the recessed portion in a planar manner. Forming the thick portion so as to overlay the recessed portion in a planar manner enables the thick portion to be readily formed by the step created by the recessed portion, and also, the surface of the colored layer can be formed smoothly even in the event of forming a thick portion, due to the existence of the step.

Next, a color filter substrate according to the present invention comprises a substrate and a colored layer which is disposed on the substrate and has a thick portion, wherein the thick portion has a thickness thicker than other portions.

According to the present invention, providing a thick portion thicker than other portions on the colored layer allows the saturation of the transmitted light passing through the thick portion to be raised higher than the saturation of the transmitted light passing through the other portions.

Now, this preferably comprises a light transmitting layer essentially capable of transmitting light between the substrate and the colored layer excluding the thick portion. Forming a transmissive layer between the substrate and the colored layer excluding the thick portion allows a step to be formed between the substrate and the transmissive layer, so the thick portion to be readily formed by the existence of the step, and also, the surface of the colored layer can be formed smoothly even in the event of forming a thick portion, due to the existence of the step.

Also, the substrate preferably has a recessed portion, with the thick portion being disposed on the recessed portion. A step can be provided on the surface of the substrate by the recessed portion, so the thick portion can be readily formed by the step, and also, the surface of the colored layer can be formed smoothly even in the event of forming a thick portion, due to the existence of the step.

Next, an electro-optical device according to the present invention comprises: an electro-optical layer containing electro-optical material; a substrate supporting the electro-optical layer; a reflective layer disposed on the substrate, and having a transmitting portion essentially capable of transmitting light; and a colored layer disposed so as to overlay at least the reflective layer in a planar manner, and having a thick portion; wherein the reflective layer has a reflecting portion on the perimeter of the transmitting portion; wherein the thick portion is disposed so as to overlay the transmitting portion in a planar manner; and wherein the thickness of the thick portion is greater than the sum of the thickness of a portion of the colored layer corresponding to the reflecting portion position and the thickness of the reflecting portion.

According to the present invention, a thick portion, thicker than the sum of the thickness of a portion of the colored layer corresponding to the reflecting portion position and the thickness of the reflecting portion, is provided to the colored layer, whereby the saturation of the transmitted light passing through the transmitting portion of the reflective layer can be increased more than with the conventional. Also, the difference in color between transmissive display and reflective display can be reduced.

Now, a transmissive layer essentially capable of transmitting light is preferably provided between the reflective layer excluding the opening and the colored layer. Due to the existence of the transmissive layer, a step is generated between the transmitting portion of the reflective layer, and the transmissive layer, so the thick portion can be readily formed by the step. Also, the surface of the colored layer can be formed smoothly even in the event of forming a thick portion, due to the existence of the step.

In this case, the transmissive layer preferably has scattering functions for scattering light. Thus, blinding from illumination light, picking up surrounding scenery, etc., can be prevented because the reflected light is scattered by the transmissive layer.

Also, the transmitting portion is preferably an opening, having a foundation layer between the reflective layer excluding the opening and the substrate. Due to the existence of the foundation layer, a step can be provided between the opening and the reflective layer excluding the opening, so the thick portion can be readily formed by the step. Also, the surface of the colored layer can be formed smoothly even in the event of forming a thick portion, due to the existence of the step.

Now, the surface of the foundation layer preferably has patterned indentations, and the reflective layer has minute patterned indentations for scattering light. Providing patterned indentations on the foundation layer, and the reflective layer above having minute patterned indentations for scattering light, means that the reflected light is scattered by the patterned indentations, so blinding from illumination light, picking up surrounding scenery, etc., can be reduced.

Also, the substrate preferably has a recessed portion, with the thick portion being disposed so as to overlay the recessed portion in a planar manner. The thick portion can be readily formed by a step on the surface of the substrate existing due to the recessed portion, due to the thick portion being disposed on the recessed portion on the substrate, and the surface of the colored layer can be formed smoothly even in the event of forming a thick portion, due to the existence of the step.

There are cases wherein the above electro-optical devices comprise an opposing substrate disposed facing the substrate across the electro-optical layer.

Also, another electro-optical device according to the present invention comprises: an electro-optical layer containing electro-optical material; a first substrate supporting the electro-optical layer; a reflective layer disposed on the first substrate, and having a transmitting portion essentially capable of transmitting light; a second substrate disposed facing the first substrate; and a colored layer disposed on the second substrate and having a thick portion thicker than other portions; wherein the thick portion is disposed so as to overlay the transmitting portion in a planar manner.

According to the present invention, the thick portion of the colored layer disposed on the second substrate is positioned so as to overlay the reflective layer disposed on the first substrate, so the transmitted light passing through the transmitting portion is transmitted through the thick portion, so the saturation of the transmitted light can be raised higher than with the conventional. Also, the difference in saturation between transmissive display and reflective display can be reduced.

Now, a transmissive layer essentially capable of transmitting light is preferably provided between the second substrate and the colored layer excluding the thick portion. A step is formed between the substrate and the transmissive layer by having a transmissive layer between the second substrate and the colored portion excluding the thick portion, and the thick portion can be readily configured by the step. Also, the surface of the colored layer can be configured smoothly even in the event of forming a thick portion, due to the existence of the step.

Also, the second substrate preferably has a recessed portion, with the thick portion being disposed on the recessed portion. The thick portion can be readily formed by the step created at the recessed portion, by the thick portion being disposed on the recessed portion on the second substrate. Also, the surface of the colored layer can be formed smoothly even in the event of forming a thick portion, due to the existence of the step.

Also, another electro-optical device according to the present invention comprises: an electro-optical layer containing electro-optical material; a first substrate supporting the electro-optical layer; a reflective layer disposed on the first substrate, and having a transmitting portion essentially capable of transmitting light; a first colored layer disposed so as to overlay at least the reflective layer in a planar manner; a second substrate disposed facing the first substrate; and a second colored layer disposed on the second substrate; wherein the reflective layer has a reflective portion on the perimeter of the transmitting portion; and wherein the first colored layer is disposed so as to overlay at least the transmitting portion and the reflecting portion in a planar manner; and wherein the second colored layer is disposed so as to overlay at least the transmitting portion in a planar manner.

According to the present invention, the sum of the thickness of the first colored layer disposed on the first substrate and second colored layer disposed on the second substrate can be configured so as to be greater at areas overlapping the transmitting portion in planar fashion in comparison with other areas, so the saturation of the transmitted light passing through the transmitting portion of the reflective layer can be raised more than the conventional. Also, the difference in saturation between transmissive display and reflective display can be reduced.

Further, the electro-optical device according to the present invention comprises: an electro-optical layer containing electro-optical material held between the first substrate and the second substrate; a first colored layer disposed on the first substrate; a reflective layer disposed on the first substrate, and having a transmitting portion essentially capable of transmitting light; and a second colored layer disposed on the second substrate; wherein the second colored layer is disposed restricted to a region overlaying the transmitting portion in a planar manner.

According to the present invention, due to the second colored layer being disposed on the second substrate restricted to a region overlaying the transmitting portion of the reflective layer disposed on the first substrate in a planar manner, the light passing through the opening in the reflective layer passes through not only the first colored layer but also the second colored layer, so the saturation of the transmitted light can be raised higher than with the conventional. Also, the difference in saturation between transmissive display and reflective display can be reduced.

Next, the color filter manufacturing method according to the present invention comprises: a step for partially forming an insulating layer on a substrate; and a step for forming a colored layer on a formation region of the insulating layer and a non-formation region of the insulating layer.

More specifically, this comprises a step for forming a colored layer on a substrate, and a step for partially forming a transmitting portion essentially capable of transmitting light on the substrate, wherein, in the step for forming the colored layer, the colored layer is formed thicker on the transmissive layer non-formation region than on the transmissive layer. Or, this comprises a step for forming a colored layer on a substrate, a step for forming a reflective layer having an opening on the substrate, and a step for forming a transmissive layer essentially capable of transmitting light on the reflective layer excluding the opening, wherein, in the step for forming the colored layer, the thick portion of the colored layer thicker than the sum of the thickness of the colored layer formed on the reflective layer at the perimeter of the opening and the thickness of the reflective layer, is formed on the opening. Further, this comprises a step for forming a colored layer having a thick portion on the substrate, a step for partially forming a foundation layer on the substrate, and a step for forming a reflective layer on the foundation layer, wherein, in the step for forming the colored layer, the thick portion is formed on the foundation layer non-formation region.

Also, another color filter manufacturing method according to the present invention comprises: a step for disposing coloring material on the substrate; a step for partially changing the hardness of the coloring material and executing hardening processing; and a step for forming a thick portion thicker than other portions on a part of the colored layer, by removing unhardened portions of the coloring material. According to these means, the thick portion is formed according to the degree of hardening of the coloring material, so the thick portion can be readily formed simply by changing the degree of the hardening processing.

Further, yet another color filter manufacturing method according to the present invention comprises: a step for disposing coloring material on the substrate; a step for partially changing the degree of exposure of the coloring material upon performing exposing; and a step for forming a thick portion thicker than other portions on a part of the colored layer, by developing the coloring material.

Next, a manufacturing method for an electro-optical device according to the present invention comprises the above-described color filter manufacturing method as a step thereof.

Also, electronic equipment according to the present invention comprises the above-described electro-optical device.

With each of the above means, the foundation layer and transmissive layer are preferably configured so as to be approximately equal in thickness to the difference between the thick portion of the colored layer and the thickness thereof at other parts. Accordingly, a colored layer having the thick portion can be formed in the manufacturing steps simply by coating the coloring material on the foundation layer and transmissive layer, and also the smoothness of the surface of the colored layer can be improved.

In each of the above means, in the event that the overall colored layer has approximately uniform optical properties, the thickness of the thick portion is preferably approximately twice the thickness of other thickness in the colored layer in the event of placing emphasis on the smoothness of the color filter substrate. Also, more specifically, this is preferably within the range of 1.4 times to 2.6 times. Particularly, in order to reduce the difference in color between reflective display and transmissive display, this is preferably within the range of 1.7 times to 2.3 times.

Also, in the event of placing emphasis on optical properties, the thickness of the thick portion is preferably within a range of 2 to 6 times the thickness of the colored layer at places other than the thick portion. In the event that the thickness of the thick portion is less than 2 times, sufficiently securing brightness in the reflective region is difficult in the event that color expression in the transmissive region is optimized, and sufficiently securing saturation in the transmissive region is difficult in the event that brightness in the reflective region is optimized. In the event that the thickness of the thick portion exceeds six times, sufficiently securing saturation in the reflective region is difficult in the event that color expression in the transmissive region is optimized, and securing brightness in the transmissive region is difficult in the event that color expression in the reflective region is optimized unless the quantity of light from the back-light is increased, besides the difficulty in securing smoothness of the color filter substrate.

Further, in order to simultaneously attain smoothness of the color filter and optical properties, the thickness of the thick portion is preferably set at a value within the range of 1.0 to 3.0 μm, and the thickness of portions other than the thick portion at a value within the range of 0.2 to 1.5 μm. Thus, the quality of color display of the reflective region and transmissive region can be improved while reducing non-uniformity in the thickness of the color filter due to existence of the thick portion. With the present invention, ease of manufacturing and smoothness can be improved by forming the foundation layer and transmissive layer to a thickness which is approximately equal to the difference between the thickness of the thick portion of the colored layer and the thickness at other portions, as described above, but in this case as well, providing a color layer satisfying the above thickness conditions enables the non-uniformity in the thickness of the color filter to be reduced and also to improve the optical properties of the color filter.

In the above means, the color filter substrate or the electro-optical device preferably has multiple arrayed pixel regions, with the colored layer displayed on each of the pixel regions, and the thick portions formed on each of the pixel regions. Also, this preferably comprises transmitting portions on the reflective layer, for each of the pixel regions.

Also, there are cases where one or the other of an overlaying shielding layer formed by overlaying colored layers exhibiting different hues and a black shielding layer are formed in inter-pixel regions of the color filter. In a case wherein the black shielding layer is to be formed, in the event that a transmissive layer is formed on the reflective layer and a colored layer is formed thereupon, the occurrence of residue generated at the time of directly forming the black shielding layer on the reflective layer can be reduced, so the transmissivity of the color filter can be improved, and the display quality thereof increased.

BRIEF DESCRIPTION OF THE DRAWINGS

FIG. 8 is schematic process drawings (a) through (c) illustrating the manufacturing method of a color filter substrate according to a seventh embodiment of the present invention, in model fashion.

FIG. 9 is schematic process drawings (a) through (c) illustrating the manufacturing method of a color filter substrate according to an eighth embodiment of the present invention, in model fashion.

FIG. 10 is schematic process drawings (a) through (c) illustrating the manufacturing method of a color filter substrate according to a ninth embodiment of the present invention, in model fashion.

FIG. 11 is schematic process drawings (a) through (c) illustrating the manufacturing method of a color filter substrate according to a tenth embodiment of the present invention, in model fashion.

FIG. 12 is schematic process drawings (a) through (c) illustrating the manufacturing method of a color filter substrate according to an eleventh embodiment of the present invention, in model fashion.

BEST MODE FOR CARRYING OUT THE INVENTION

Next, the color filter substrate and electro-optical device according to the present invention, and the manufacturing method thereof, will be described in detail, with reference to the attached drawings.

First Embodiment

Figure 1:
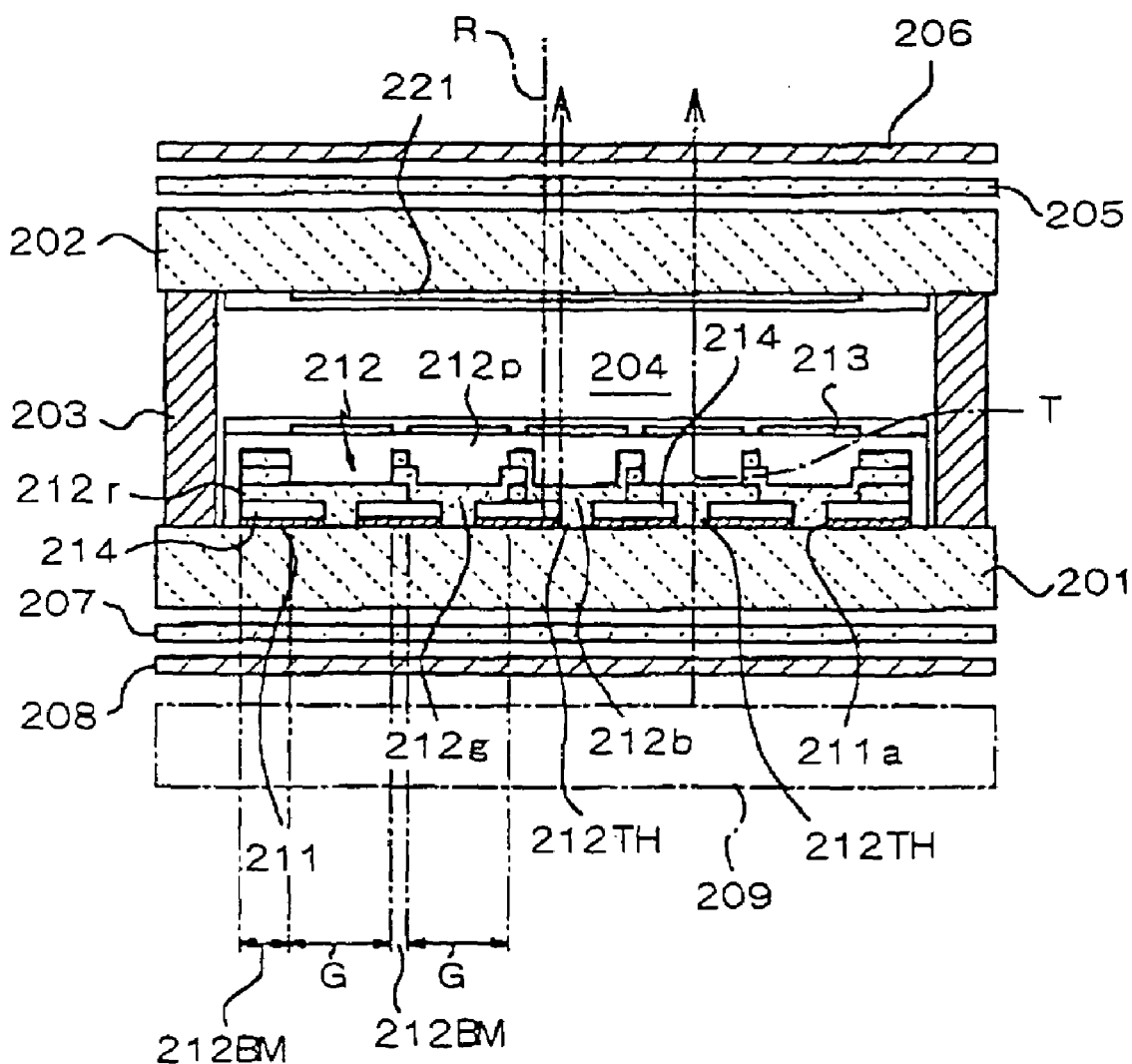
FIG. 1 is a schematic cross-sectional diagram illustrating the structure of a liquid crystal display panel according to a first embodiment of the present invention, in model fashion.

FIG. 1 is a schematic cross-sectional diagram illustrating a substrate 201 which is a first embodiment of the color filter substrate according to the present invention, and a liquid crystal display panel 200 which is a first embodiment of the electro-optical device using the color filter substrate, in model fashion.

Figure 19:
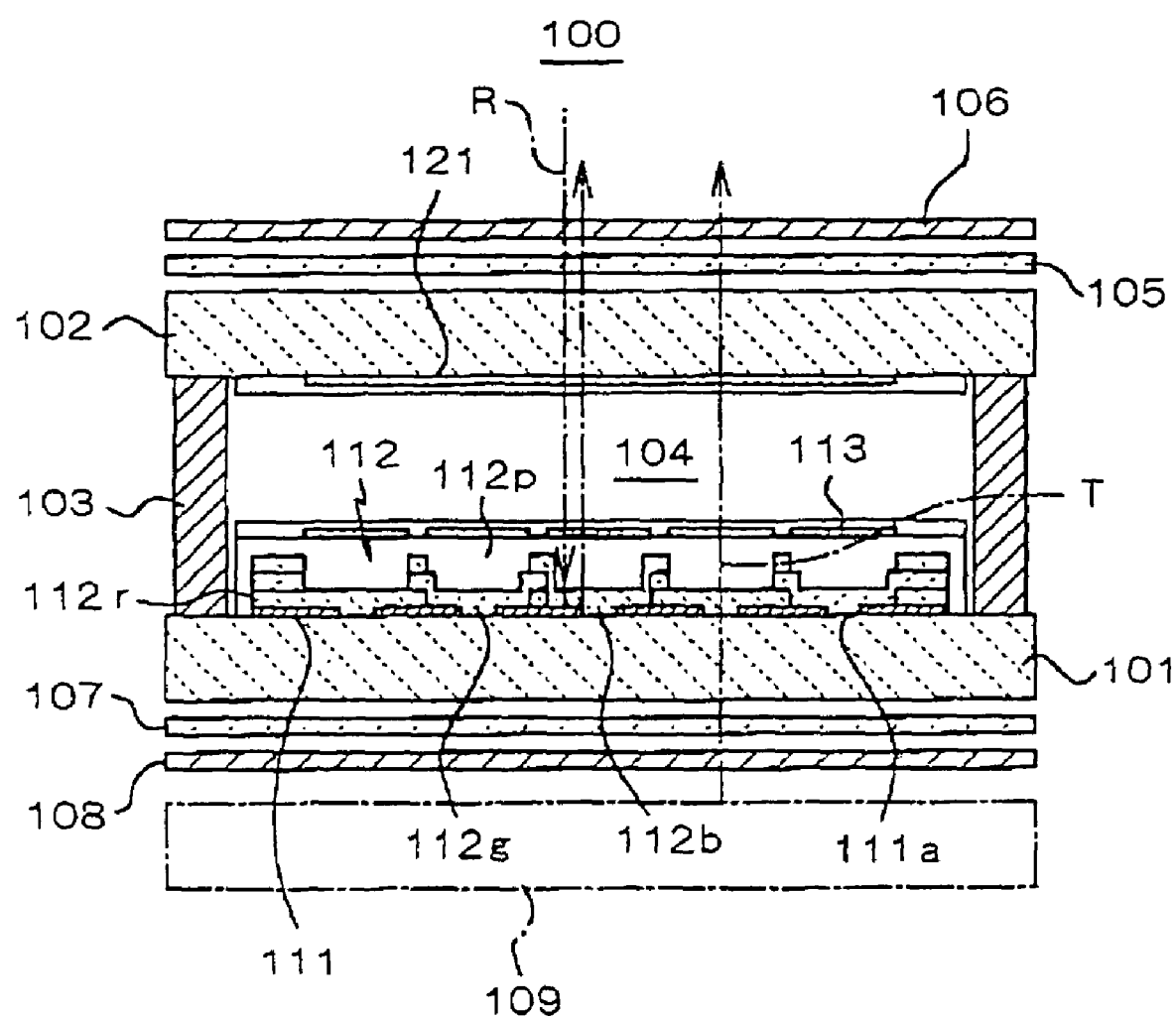
FIG. 19 is a schematic cross-sectional diagram illustrating the structure of a conventional transflective liquid crystal display panel, in model fashion.

With this liquid crystal display panel 200, a substrate 201 and a substrate 202 formed of glass or plastic or the like are applied one to another with a seal member 203 introduced therebetween, with liquid crystal 204 sealed inside. The substrate 202, the transparent electrodes 221 formed on the substrate 202, the phase difference plates 205 and 207, and the polarizing plates 206 and 208, are exactly the same as those in the above conventional example shown in FIG. 19.

Figure 7:
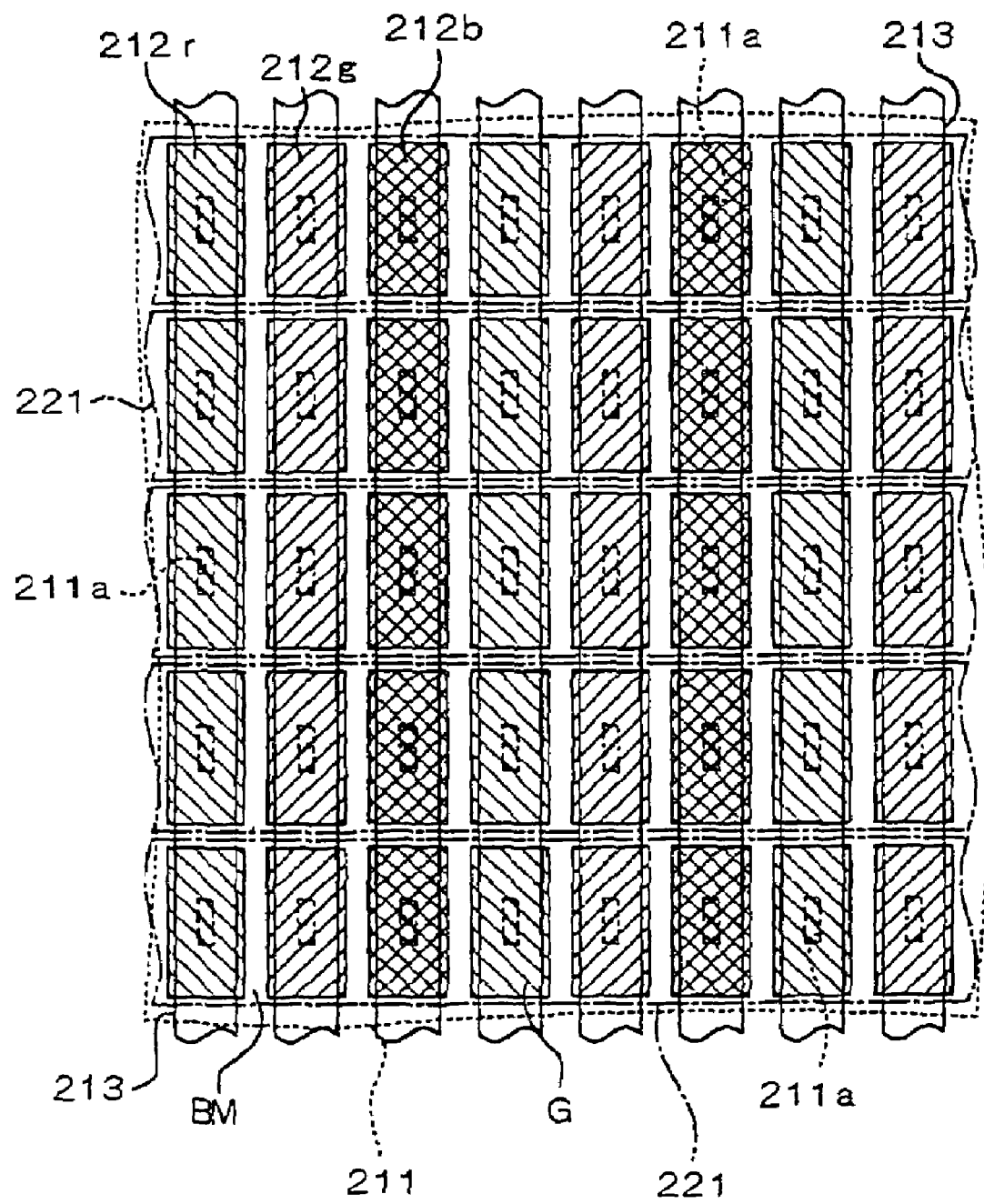
FIG. 7 is a schematic plan diagram illustrating the planar structure of a color filter substrate according to the first embodiment, in model fashion.

With the present embodiment, a reflective layer 211 around 50 nm to 250 nm in thickness, having openings 211a through which light is essentially capable of being transmitted, is formed on the inner face of the substrate 201. This reflective layer 211 can be formed of thin films such as aluminum, aluminum alloy, silver alloy, or the like. The openings 211a are formed at each pixel G arrayed and set vertically and horizontally in matrix fashion following the inner face of the substrate 210, having a predetermined aperture ratio (e.g., 10 to 30%) as to the entire area of the pixel G. As shown in FIG. 7 which is a plan view of the substrate 201 from above, the openings 211a may be formed one to each pixel G or multiple openings may be provided to each pixel.

A transmissive layer 214 having thickness of around 0.5 $\mu$m to 2.5 $\mu$m is formed partially on the reflective layer 211, so as to avoid the openings 211a. The transmissive layer 214 can be formed of inorganic materials such as $SiO_2$, $TiO_2$, or resins such as acrylic resin or epoxy resin or the like, and has transmissivity with regard to the visible light region, but particularly preferably is transparent with regard to visible light rays, for example, having average transmissivity of 70% or more with regard to the visible light region and has little wavelength dispersion (e.g., fluctuation on transmissivity of 10% or less).

In the event of a primary color type color filter for example, colored layers 212r, 212g, and 212b, around 0.5 $\mu$m to 2.0 $\mu$m in thickness, of the three colors R (red), G (green), and B (blue), are arrayed for each pixel G with a suitable array form (FIG. 7 shows a color filter with a stripe array) such as, for example, a known stripe array, delta (triangle) array, diagonal mosaic (diagonal) array, etc. on the transmissive layer 214. Now, an overlaying shielding portion 212BM is formed between the pixels G, wherein the colored layers 212r, 212g, and 212b overlap one another to exhibit shielding properties. Now, with the colored layers 212r, 212g, and 212b, the surface is basically formed flat, except for the overlaying shielding portion 212BM.

A protective film 212p formed of transparent resin or the like is formed upon the colored layers 212r, 212g, and 212b, and the overlaying shielding portion 212BM. This protective film 212p protects the colored layers from corrosion due to chemicals and the like in processing and from soiling, and also smoothes the surface of the color filter 212.

Transparent electrodes 213 formed of a transparent conductive material such as ITO (Indium-Tin Oxide) or the like are formed on the color filter 212. In the present embodiment, the transparent electrodes 213 are formed in the shape of multiple parallel stripes. Also, the transparent electrodes 231 extend in a direction orthogonal to the transparent electrodes 221 formed on similar stripe fashion on the substrate 202, such that the components of the liquid crystal panel 200 contained in the intersection region between the transparent electrodes 213 and the transparent electrodes 221 (indicated by the dashed line in FIG. 7) (the reflective layer 211, color filter 212, transparent electrode 213, and the liquid crystal 204 and the part of the transparent electrode 221 in the above intersecting region) make up the pixel G.

In the present embodiment, due to the transmissive layer 214 formed, a part of the colored layers enter into a non-formation region where the transmissive layer 214 is not formed in the colored layers 212r, 212g, and 212b, i.e., a region overlaying in a planar fashion with the opening 211a of the reflective layer 211, thereby providing thick portions 212TH formed thicker than other portions.

With this liquid crystal panel 200, light passes through the reflective path R in the event that reflective display is to be made and is visually recognized, and light passes through the transmissive path T in the event that transmissive display is to be made and is visually recognized. At this time, the color filter 212 operates in the same manner in the reflective path T as with conventional arrangements, but the transmissive path T passes through the opening 211a of the reflective layer 211, so the transmitted light passes through the thick portions 212TH of the colored layers 212r, 212g, and 212b, and consequently, the saturation in transmissive display improves in comparison with the conventional structure shown in FIG. 19.

Accordingly, with the present embodiment, due to forming the thick portions 212TH at the positions on the color filter 212 overlapping the openings 211a of the reflective layer 211 in planar fashion, the saturation of transmissive display can be improved without sacrificing brightness of reflective display. Particularly, the difference in saturation between reflective display and transmissive display can be reduced more than with the conventional.

Also, with the present embodiment, the thick portion 212TH is provided on the color filter 212 by partially forming the transmissive layer 214, so the surface (upper face in the drawings) of the colored layers 212r, 212g, and 212b of the color filter 212 can be formed smooth, so the uniformity of the thickness of the liquid crystal layer can be improved, and the display quality of the liquid crystal display panel can be improved.

Now, in the event of placing emphasis on the smoothness of the color filter 212, that is to say, in the event of giving priority to configuring the surface of the protective layer 212p smooth, or configuring the electrode face of the transparent electrodes 213 smooth, the thickness of the thick portion 212TH is preferably approximately 2 times the thickness of the portion overlaying the reflective layer 211 in planar fashion, i.e., the thickness of other portions, if the colored layer of the color filter is formed approximately uniform regarding optical properties. More specifically, this is preferably within the range of 1.4 times to 2.6 times, and preferably within 1.7 times to 2.3 times. Thus, the difference between the saturation of reflective display and the saturation of transmissive display can be reduced, and the difference in color between both displays can be further reduced.

On the other hand, in the event of giving emphasis to optical properties of the color filter 212, i.e., in the event of giving priority to the color display forms having excellent color reproducibility both in transmissive display and in reflective display, the thickness of the thick portion 212TH is preferably within the range of between 2 to 6 times that of the thickness at other portions. In the event that the thickness of the thick portion 212TH is less than 2 times, sufficiently securing brightness in the reflective region is difficult in the event that color expression in the transmissive region is optimized, and sufficiently securing saturation in the transmissive region is difficult in the event that brightness in the reflective region is optimized. In the event that the thickness of the thick portion 212TH exceeds 6 times, sufficiently securing saturation in the reflective region is difficult in the event that color expression in the transmissive region is optimized, and securing brightness in the transmissive region is difficult in the event that color expression in the reflective region is optimized unless the quantity of light from the back-light is increased, leading to increased electric power consumption of the back-light, besides making securing smoothness of the color filter substrate more difficult.

Figure 20:
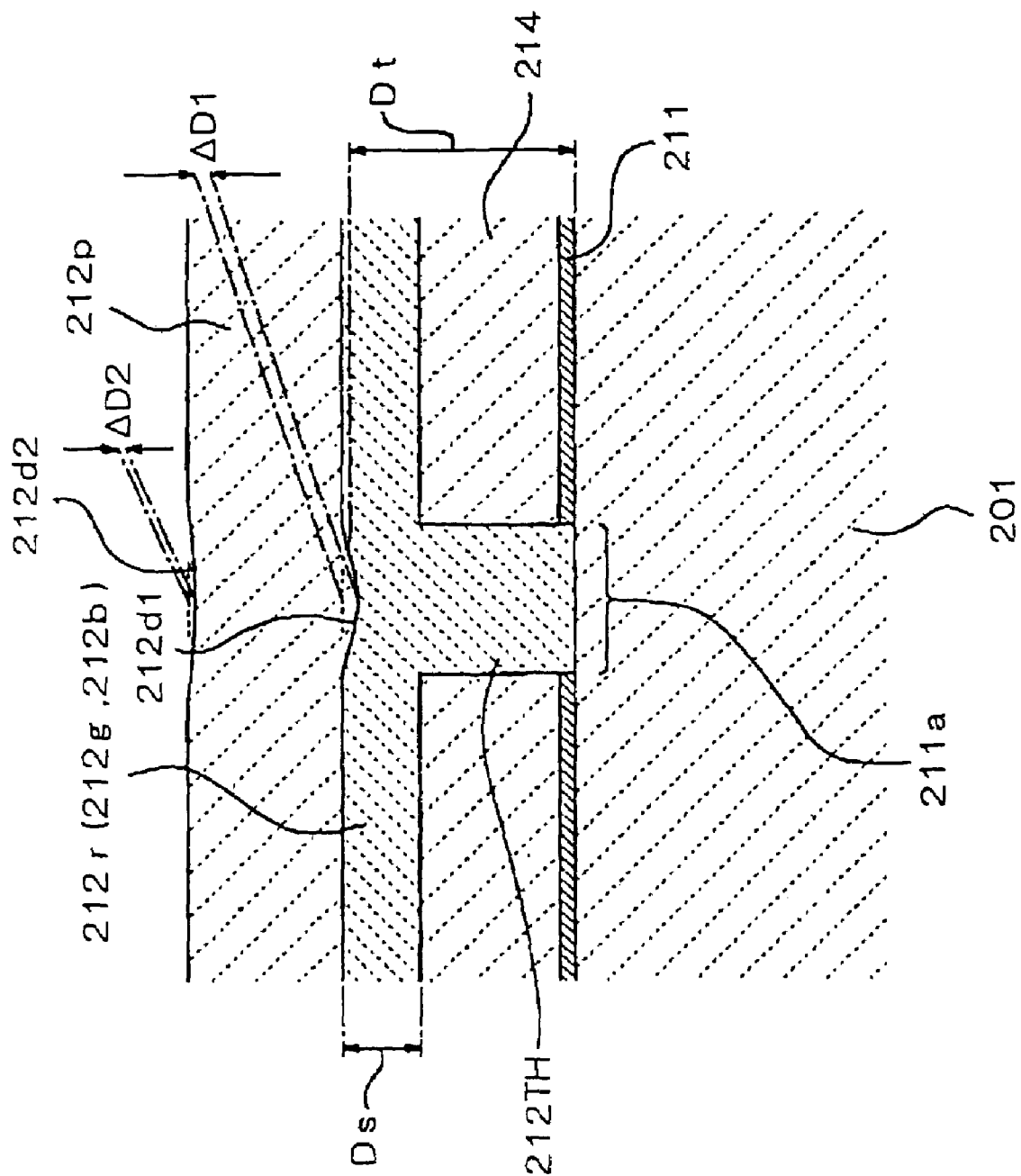
FIG. 20 is an enlarged partial cross-sectional diagram illustrating the principal portions of the color filter substrate according to the first embodiment in an enlarged manner.

Now, in the event of actually configuring a liquid crystal display device, the smoothness of the color filter 212 is important in improving the display quality thereof by guaranteeing the uniformity of the thickness of the liquid crystal layer and the reproducibility, and also the optical properties of the color filter 212 are important in improving the quality of the color display forms in transmissive display and reflective display. The present Inventors have found that, in order to satisfy both the smoothness and optical properties of the color filter 212, restricting the thickness of the colored layers 212r, 212g, and 212b, to within a predetermined range is effective. That is, as shown in FIG. 20, both smoothness and optical properties of the color filter 212 can be simultaneously realized by setting the thickness Dt of the thick portions 212TH of the colored layers 212r, 212g, and 212b (the thickness of the colored layer in the transmissive region) to 1.0 to 3.0 µm, and the thickness Ds at other portions (the thickness of the colored layer in the reflective region) to 0.2 to 1.5 µm. In the event that the thickness Dt exceeds the above range, securing smoothness becomes difficult since the steps on the colored layer become great, and in the event that the thickness Dt falls below the above range, maintaining saturation of transmissive display becomes difficult. Also, in the event that the thickness Ds exceeds the above range, securing smoothness becomes difficult since the steps on the colored layer become great, and in the event that the thickness Ds falls below the above range, maintaining saturation of reflective display becomes difficult. Further, as a matter of course, the ratio of Dt and Ds is preferably within the range of 2 to 6 as with the above described, even in the event that the thickness Dt and Ds of the colored layer are within the range of conditions.

As shown in FIG. 20, the thickness Dt and Ds of the colored layer are set by forming the transmissive layer 214 in the reflective layer 211, but in the event that the colored layers 212r, 212g, and 212b are formed thereby, dimples 212d1 are formed in the upper surface of the thick portions 212TH, leading to dimples 212d2 in the surface of the protective layer 212p. Setting Dt and Ds within the above ranges allows the depth ΔD1 of the dimples 212d1 and the depth ΔD2 of the dimples 212d2 to be reduced, thereby improving the uniformity of the thickness of the liquid crystal layer and the reproducibility. More specifically, the depth ΔD1 of the dimples 212d1 is preferably set to 0.5 µm or less, and the depth ΔD2 of the dimples 212d2 to 0.2 µm or less. Particularly, setting the depth ΔD2 of the dimples 212d2 to 0.1 µm or less enables a high-quality liquid display, with no display irregularities, to be realized.

Second Embodiment

Figure 2:
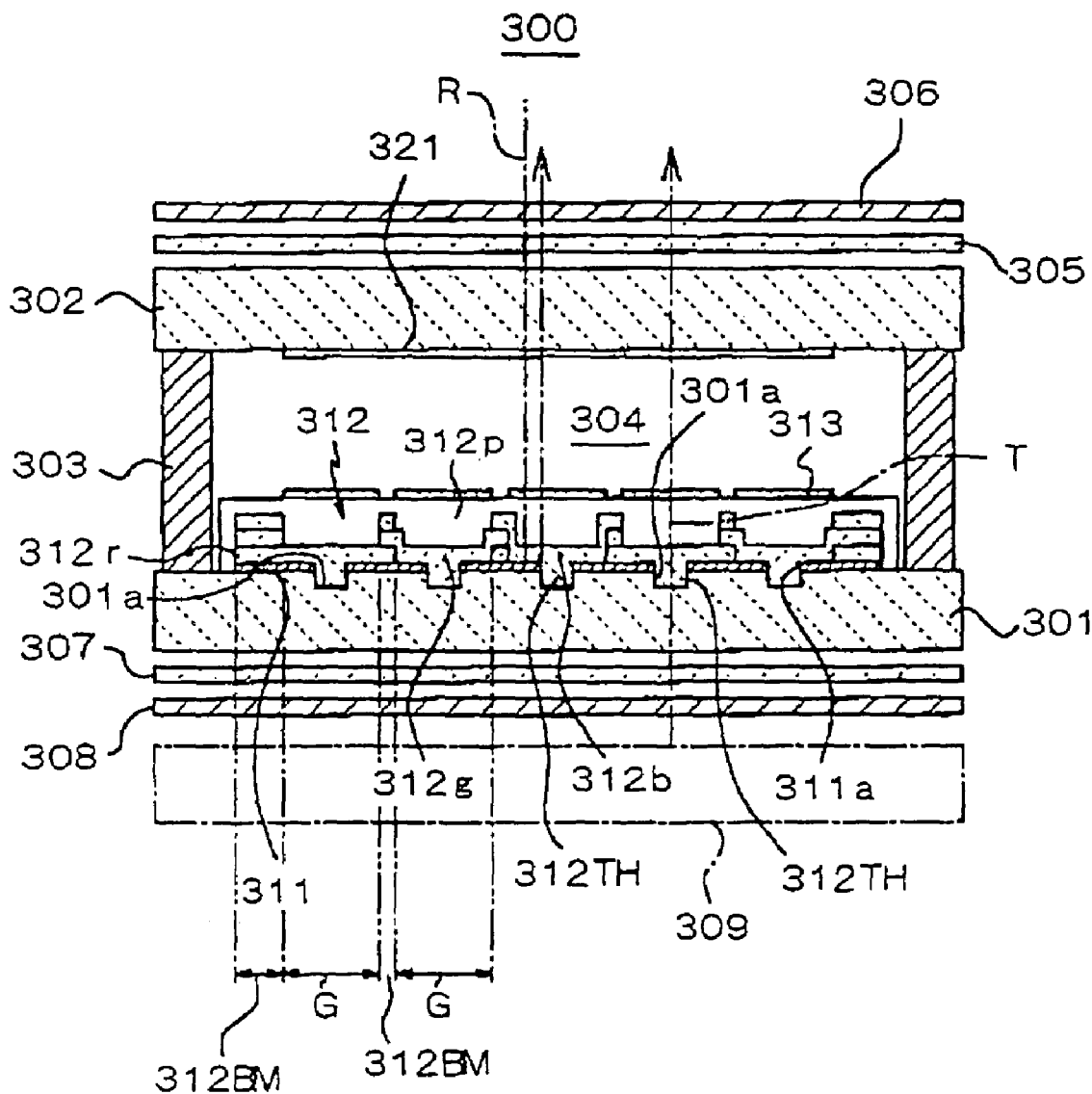
FIG. 2 is a schematic cross-sectional diagram illustrating the structure of a liquid crystal display panel according to a second embodiment of the present invention, in model fashion.

Next, FIG. 2 is a schematic cross-sectional diagram illustrating a color filter substrate 301 which is a second embodiment according to the present invention, and a liquid crystal display panel 300 which is a second embodiment using the color filter, in model fashion. This embodiment comprises substrates 301 and 302, a seal member 303, liquid crystal 304, transparent electrodes 313 and 321, phase difference plates 305 and 307, and polarizing plates 306 and 308, in the same manner as with the first embodiment, so description thereof will be omitted.

With the present embodiment, recessed portions 301a having a depth of around 0.5 µm to 2.5 µm provided for each pixel G arrayed in the same manner as with the first embodiment are provided on the surface of the substrate 301. The recessed portions 301a are provided at regions overlaying the openings 311a of the reflective layer 311 formed on the surface of the substrate 301 in planar fashion. Note that the reflective layer 311 is formed with a thickness of around 50 nm to 250 nm. Formed upon the substrate 301 and reflective layer 311 is the color filter 312 having the colored layers 312r, 312g, and 312b with a thickness of around 0.5 µm to 2.0 µm, the overlaying shielding portions 312BM, and the protective film 312p.

With the present embodiment, recessed portions 301a are provided to the substrate 301, and coloring material is filled in the recessed portions 301a as well, thereby providing the colored layers 312r, 312g, and 312b with thick portions 312TH on the recessed portions 301a. The thick portions 312TH are formed corresponding to the openings 311a of the reflective layer 311, so the transmitted light of the back-light 309 passing through the transmissive path T passes through the thick portions 312TH, consequently allowing the saturation of transmissive display to be improved in the same manner as with the first embodiment, and the difference in color between reflective display and transmissive display can be reduced.

Also, with the present embodiment, partially forming the recessed portions 301a provides the thick portions 312TH to the color filter 312, so the surfaces (upper face in the drawing) of the colored layers 312r, 312g, and 312b of the color filter 312 can be formed smooth, thereby enabling the uniformity of the thickness of the liquid crystal layer to be improved, and the display quality of the liquid crystal display panel to be improved.

Note that with the present embodiment as well, as with the first embodiment, in the event of placing emphasis on optical properties of the color filter 312, i.e., in the event of giving priority to the color display forms both having excellent color reproducibility both in transmissive display and in reflective display, the thickness of the thick portion 312TH is preferably within the range of between 2 to 6 times that of the thickness at other portions.

Also, both smoothness and optical properties of the color filter 312 can be simultaneously realized by setting the thickness Dt of the thick portions 312TH of the colored layers 312r, 312g, and 312b (the thickness of the colored layer in the transmissive region) to 1.0 to 3.0 μm, and the thickness Ds at other portions (the thickness of the colored layer in the reflective region) to 0.2 to 1.5 m. Further, as a matter of course, the ratio of Dt and Ds is preferably within the range of 2 to 6 as described above, even in the event that the thickness Dt and Ds of the colored layer are within the range of conditions.

Further, the thickness Dt and Ds of the colored layer are set by forming recessed portions 301a on the substrate 301, whereby the depth of dimples formed on the upper surface of the thick portions 312TH of the colored layer is preferably set to 0.5 μm or less, and the depth of dimples formed on the surface of the protective layer 312p to 0.2 μm or less. Particularly, setting the depth of the dimples of the protective layer 312p to 0.1 μm or less enables a high-quality liquid display, with no display irregularities, to be realized.

Third Embodiment

Figure 3:
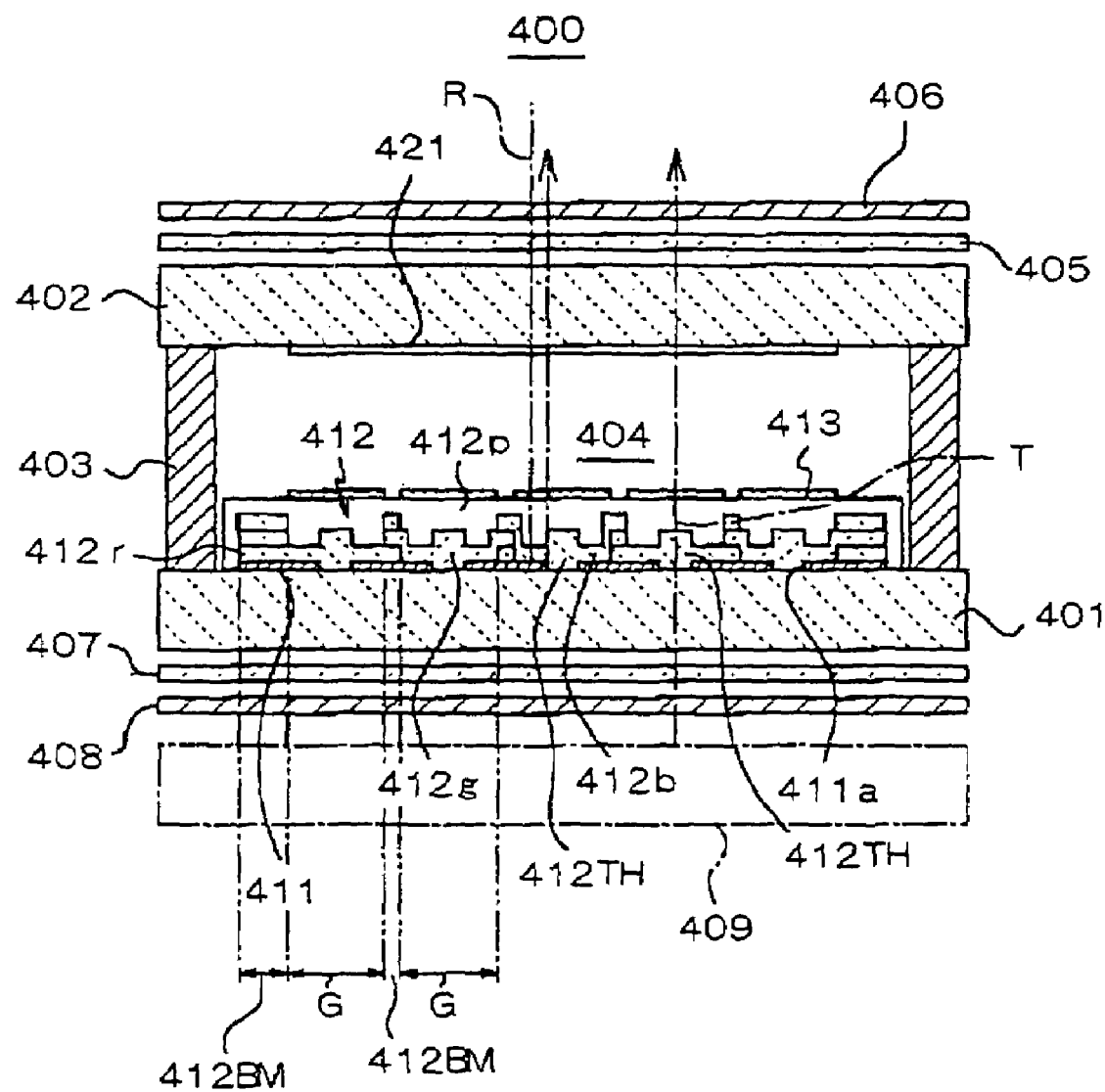
FIG. 3 is a schematic cross-sectional diagram illustrating the structure of a liquid crystal display panel according to a third embodiment of the present invention, in model fashion.

Next, the color filter substrate 401 and liquid crystal display panel 400 according to the third embodiment of the present invention will be described with reference to FIG. 3. This embodiment also comprises substrates 401 and 402, a seal member 403, liquid crystal 404, transparent electrodes 413 and 421, phase difference plates 405 and 407, and polarizing plates 406 and 408, configured in the same manner as with the first embodiment, so description thereof will be omitted.

With this embodiment, a reflective layer 411 of a thickness of around 50 μm to 250 nm having openings 411a is formed on the substrate 401, and a color filter 412 having the colored layers 412r, 412g, and 412b with a thickness of around 0.5 μm to 2.0 μm, overlaying shielding portions 412BM, and the protective film 412p, is formed directly thereupon. Now, thick portions 412TH are provided on each of the colored layers 412r, 412g, and 412b, directly above the openings 411a on the reflective layer 411 (the regions overlapping in planar fashion). The thick portions 412TH are provided by forming the surface of the colored layers 412r, 412g, and 412b directly above the openings 411a so as to be around 0.5 μm to 2.0 μm higher than the other portions.

With the present embodiment, the saturation of transmissive display can be improved, while reducing the difference in color between transmissive display and reflective display as with the above embodiments. Also, patterned indentations are formed on the surface of the colored layer with the present embodiment due to the thick portions, but instead, there is no need to form the transmissive layer according to the first embodiment, or to form recessed portions according to the second embodiment.

Further, with the present embodiment as well, in the event of placing emphasis on optical properties of the color filter 412 as with the first embodiment, that is, in the event of giving priority to the color display forms both having excellent color reproducibility in both transmissive display and reflective display, the thickness of the thick portion 312TH is preferably within the range of between 2 to 6 times that of the thickness at other portions.

Fourth Embodiment

Figure 4:
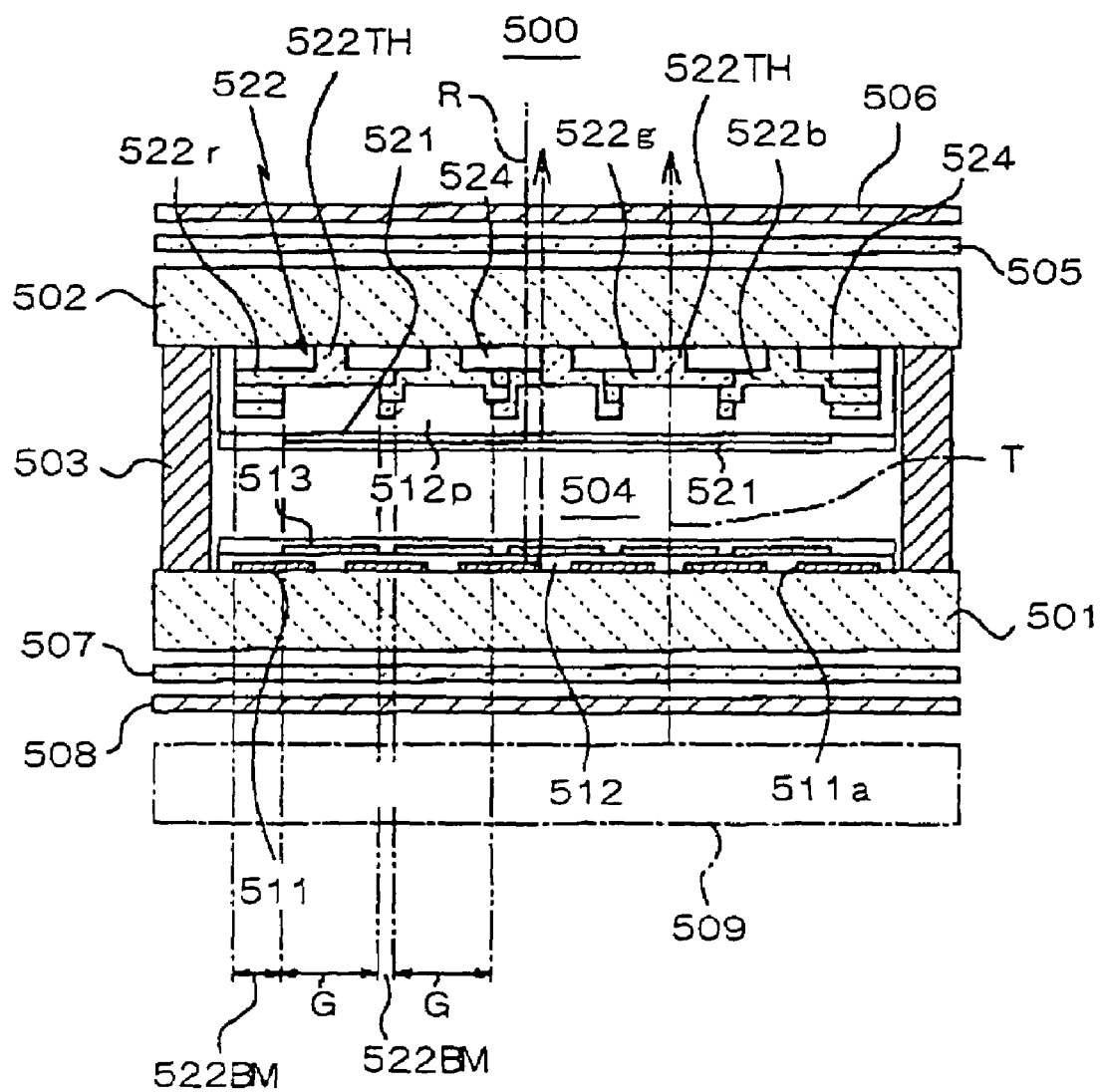
FIG. 4 is a schematic cross-sectional diagram illustrating the structure of a liquid crystal display panel according to a fourth embodiment of the present invention, in model fashion.

Next, the color filter substrate 501 and liquid crystal display panel 500 according to the fourth embodiment of the present invention will be described with reference to FIG. 4. This embodiment also comprises substrates 501 and 502, a seal member 503, liquid crystal 504, transparent electrodes 513 and 521, phase difference plates 505 and 507, and polarizing plates 506 and 508, configured in the same manner as with the first embodiment, so description thereof will be omitted.

With the present embodiment, unlike the configuration wherein the color filter is formed on a substrate comprising a reflective layer as with the first through third embodiments, the color filter 522 is formed on the substrate 502 facing the substrate 501 instead of having a color filter formed on the substrate 501 having the reflective layer 511.

A reflective layer 511 of a thickness around 50 nm to 250 nm having openings 511a serving as transmitting portions capable of essentially transmitting light is formed on the substrate 501 in the same way as the above embodiments, a transparent insulating film 512 is formed on the reflective layer 511, and transparent electrodes 513 are formed on the insulating film 512.

On the other hand, a transmissive layer 524 around 0.5 μm to 2.5 μm in thickness is partially formed on the substrate 502, and a color filter 522 comprising the colored layers 522r, 522g, and 522b with a thickness of around 0.5 mm to 2.0 mm, overlaying shielding portions 522BM, and the protective film 522p, is formed on the substrate 502 and the transmissive layer 524.

With the color filter 522, the colored layers are formed for each pixel G, with the overlaying shielding portions 522BM formed therebetween. Also, thick portions 522TH are provided to the colored layers, corresponding to the non-formation regions of the transmissive layer 524. The thick portions 522TH are configured so as to be positioned at regions corresponding to the openings 511a of the reflective layer 511 formed on the substrate 501, i.e., in regions overlaying the openings 511a in planar fashion.

With this embodiment as well, external light passing through the reflective path R passes through the color filter 522 twice, while the transmitted light of the back-light 509 passing through the transmissive path T passes through the color filter 522 only once. At this time, while the reflective path R passes through portions other than the thick portions 522TH of the colored layers, the transmissive path T passes through the thick portions 522TH of the colored layers, so the saturation of transmissive display can be improved over conventional structures, while difference in color between reflective display and transmissive display can be reduced.

The color filter substrate for this embodiment is the substrate 502, and unlike the preceding embodiments, the reflective layer is not formed on the substrate 502. That is to say, the color filter substrate according to the present embodiment is formed as a substrate opposing the substrate 501 upon which the reflective layer is formed, and the properties relating to a color of the transflective liquid crystal display panel can be improved by providing thick portions at a part of the colored layer provided for each pixel, with such a color filter substrate not having a reflective layer, as well.

Also, with the present embodiment, partially forming the transmissive layer 524 provides the thick portions 522TH to the color filter 522, so the surfaces (upper face in the drawing) of the colored layers 522r, 522g, and 522b of the color filter 522 can be formed smooth, thereby enabling the uniformity of the thickness of the liquid crystal layer to be improved, and the display quality of the liquid crystal display panel to be improved.

Now, with the present embodiment, a color filter 522 having the same structure as with the first embodiment is formed on the substrate 502 facing the substrate 501 upon which the reflective layer 511 is formed, but the structure of the color filter 522 may be a structure wherein recessed potions are provided, as with the second embodiment, or may be a structure wherein the surface of the colored layer is partially raised, as with the third embodiment.

Note that with the present embodiment as well, as with the first embodiment, in the event of placing emphasis on optical properties of the color filter 522, i.e., in the event of giving priority to the color display forms both having excellent color reproducibility in both transmissive display and reflective display, the thickness of the thick portions 522TH is preferably within the range of between 2 to 6 times that of the thickness at other portions.

Also, both smoothness and optical properties of the color filter 522 can be simultaneously realized by setting the thickness Dt of the thick portions 522TH of the colored layers 522r, 522g, and 522b (the thickness of the colored layer in the transmissive region) to 1.0 to 3.0 μm, and the thickness Ds at other portions (the thickness of the colored layer in the reflective region) to 0.2 to 1.5 μm. Further, as a matter of course, the ratio of Dt and Ds is preferably within the range of 2 to 6 as described above, even in the event that the thickness Dt and Ds of the colored layer are within the range of conditions.

Further, the thickness Dt and Ds of the colored layer are set by forming a transmissive layer 524 on the substrate 502, whereby the depth of dimples formed on the upper surface of the thick portions 522TH of the colored layer is preferably set to 0.5 μm or less, and the depth of dimples formed on the surface of the protective layer 522p to 0.2 μm or less. Particularly, setting the depth of the dimples of the protective layer 522p to 0.1 μm or less enables a high-quality liquid display, with no display irregularities, to be realized.

Fifth Embodiment

Figure 5:
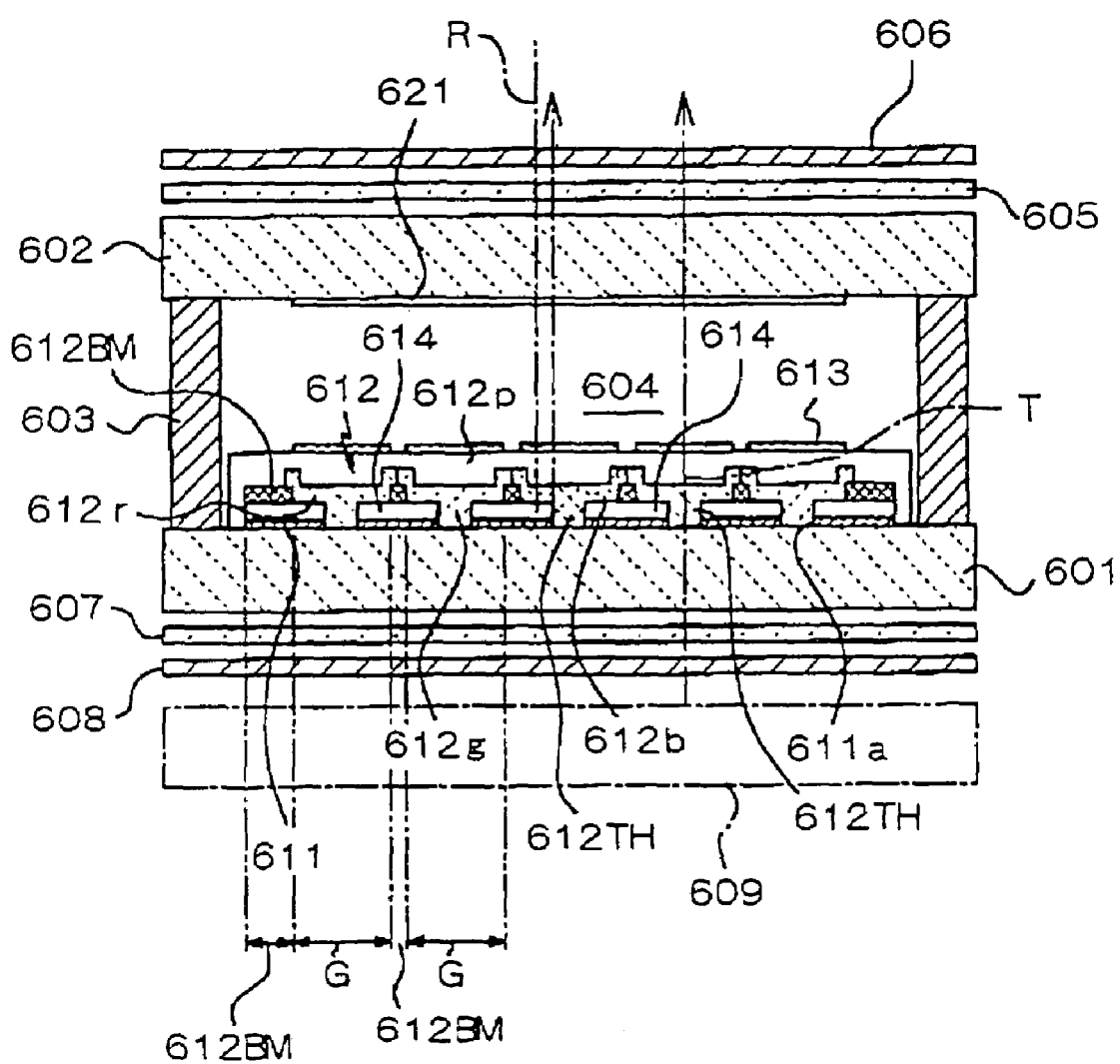
FIG. 5 is a schematic cross-sectional diagram illustrating the structure of a liquid crystal display panel according to a fifth embodiment of the present invention, in model fashion.

Next, the color filter substrate 601 and liquid electro-optical device according to the fifth embodiment of the present invention will be described with reference to FIG. 5. FIG. 5 is a schematic cross-sectional diagram illustrating the structure of the liquid crystal display panel 600 of the present embodiment, in model fashion.

The liquid crystal display panel 600 comprises substrates 601 and 602, a seal member 603, liquid crystal 604, transparent electrodes 613 and 621, phase difference plates 605 and 607, and polarizing plates 606 and 608, configured in the same manner as with the first embodiment, so description thereof will be omitted.

Also, as with the first embodiment, a reflective layer 611 of a thickness of around 50 nm to 250 nm having openings 611a serving as transmitting portions capable of essentially transmitting light is formed on the surface of the substrate 601, a transmissive layer 614 around 0.5 μm to 2.5 μm in thickness is formed on the reflective layer 611, and the color filter 612 is further formed upon these.

With the present embodiment, a black shielding layer 612BM is formed at the color filter 612 instead of the overlaying shielding layer in the above embodiments. A black resin material, for example, one with black pigment dispersed in resin, or the like, can be used for the black shielding layer 612BM.

Colored layers 612r, 612g, and 612b having thickness of around 0.5 μm to 2.0 μm are sequentially formed on the black shielding layer 612BM and the transmissive layer 614, and a protective film 612p is formed thereupon. The colored layers are each formed so that the perimeters thereof are overlaid on the black shielding layer 612BM.

With the present embodiment, a separate step for forming the black shielding layer 612BM becomes necessary, but the thickness of the color filter can be reduced as compared with cases wherein the overlaying shielding layer is used, and moreover, the smoothness of the surface of the color filter can be improved.

Note that with the present embodiment as well, as with the first embodiment, in the event of placing emphasis on optical properties of the color filter 612, i.e., in the event of giving priority to the color display forms both having excellent color reproducibility in both transmissive display and reflective display, the thickness of the thick portions 612TH is preferably within the range of between 2 to 6 times that of the thickness at other portions.

Also, both smoothness and optical properties of the color filter 612 can be simultaneously realized by setting the thickness Dt of the thick portions 612TH of the colored layers 612r, 612g, and 612b (the thickness of the colored layer in the transmissive region) to 1.0 to 3.0 μm, and the thickness Ds at other portions (the thickness of the colored layer in the reflective region) to 0.2 to 1.5 μm. Further, as a matter of course, the ratio of Dt and Ds is preferably within the range of 2 to 6 as described above, even in the event that the thickness Dt and Ds of the colored layer are within the range of conditions.

Further, the thickness Dt and Ds of the colored layer are set by forming a transmissive layer 614 on the substrate 601, whereby the depth of dimples formed on the upper surface of the thick portions 612TH of the colored layer is preferably set to 0.5 μm or less, and the depth of dimples formed on the surface of the protective layer 612p to 0.2 μm or less. Particularly, setting the depth of the dimples of the protective layer 612p to 0.1 μm or less enables a high-quality liquid display, with no display irregularities, to be realized.

Sixth Embodiment

Figure 6:
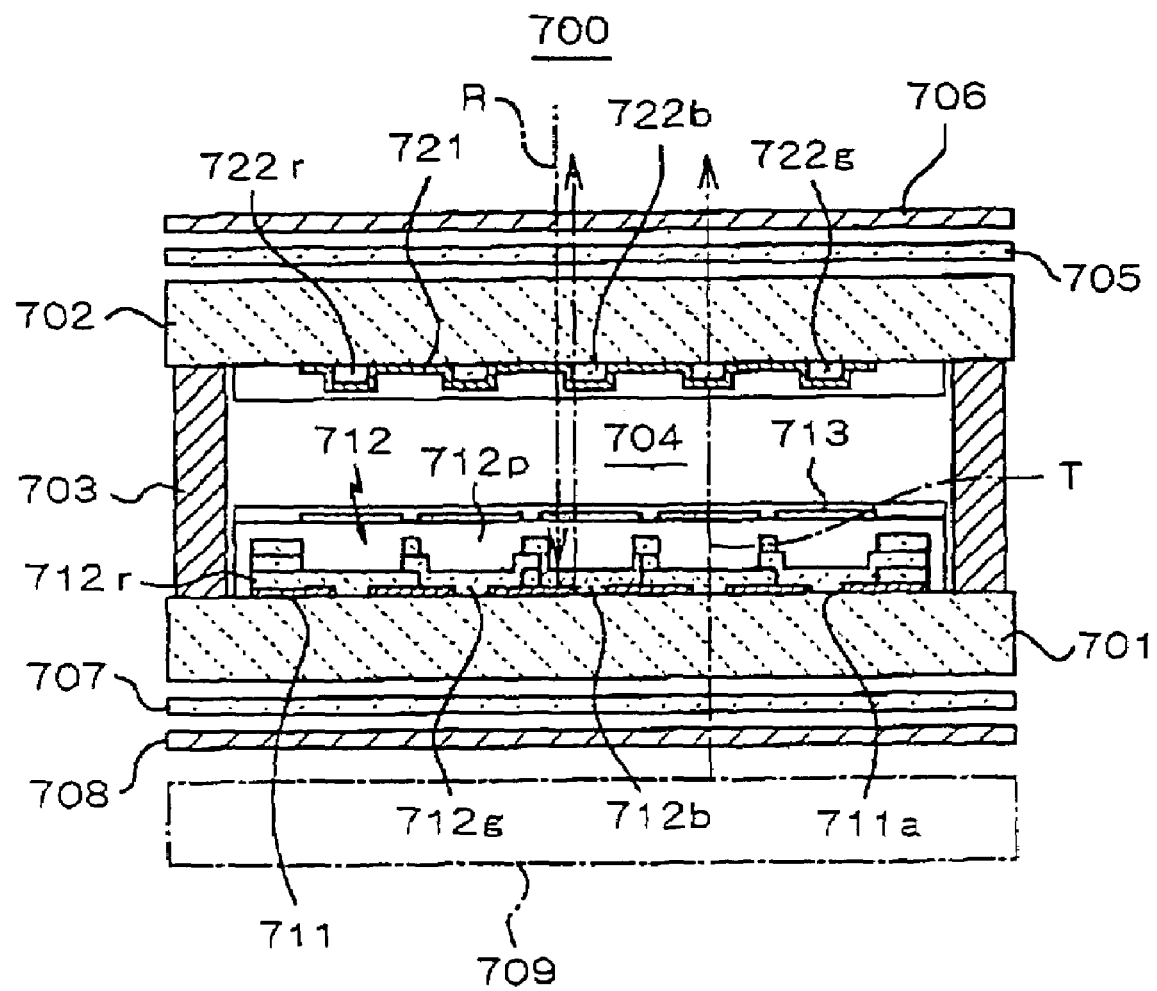
FIG. 6 is a schematic cross-sectional diagram illustrating the structure of a liquid crystal display panel according to a sixth embodiment of the present invention, in model fashion.

Next, a liquid crystal display panel 700 according to the sixth embodiment of the present invention will be described with reference to FIG. 6. This embodiment comprises the substrates 701 and 702, seal member 703, liquid crystal 704, phase difference plates 705 and 707, polarizing plates 706 and 708, a reflective layer 711 of a thickness of around 50 nm to 250 nm having openings 711a, and the color filter 712 having colored layers 712r, 712g, and 712b with thickness of around 0.5 μm to 2.0 μm, as with the liquid crystal display panel 100 of the conventional structure shown in FIG. 19.

With the present embodiment, restricted colored layers 722r, 722g, and 722b with thickness of around 0.5 μm to 2.0 μm, of the same color as the colored layers of the color filter 712, are formed on the inner face of the substrate 702, and transparent electrodes 721 are formed upon these.

The restricted colored layers 722r, 722g, and 722b are each formed of pattern shapes restricted to the range overlapping with the openings 711a of the reflective layer 711 formed on the substrate 701, in planar fashion.

Consequently, with the present embodiment, the thickness totaling the thickness of the colored layers 712r, 712g, and 712b of the color filter 712 on the substrate 701 and the thickness of the restricted colored layers 722r, 722g, and 722b on the substrate 702 is greater than the thickness at other portions at regions overlapping the openings 711a of the reflective layer 711 in planar fashion. Accordingly, optically, the same advantages are obtained as in the case of having formed a colored layer having thick portions as with the above embodiments.

Seventh Embodiment

Next, the method for manufacturing a color filter substrate as a seventh embodiment according to the present invention will be described with reference to FIG. 8. This method for manufacturing a color filter substrate relates to the method for manufacturing the color filter substrate used in the liquid crystal display panel 200 according to the first embodiment.

First, a thin film formed of metals such as aluminum, aluminum alloy, silver alloy, chromium, etc., is formed on the surface of the substrate 201, by vapor deposition or sputtering or the like, and this is patterned with known photo-lithography, to form a reflective layer 211 around 50 nm to 250 nm in thickness, having openings 211a, as shown in FIG. 8(a).

Next, as shown in FIG. 8(b), a transmissive layer 214 around 0.5 μm to 2.5 μm in thickness is formed on the portions excluding the regions immediately above the openings 211a of the reflective layer 211. The transmissive layer 214 can be formed by, for example, forming an inorganic layer or organic layer on the entire surface of the substrate 201 and reflective layer 211, and then selectively removing the portions immediately above the openings 211a by photo-lithography or the like. As for the materials of the transmissive layer 214, inorganic materials such as $SiO_2$, $TiO_2$, or organic resins such as transparent acrylic resin or epoxy resin or the like, can be used.

Subsequently, as shown in FIG. 8(c), a photosensitive resin (photosensitive resist) having pigment or dye or the like exhibiting a predetermined hue dispersed therein is coated, and patterning is performed by exposing and developing with a predetermined pattern, thereby sequentially forming the colored layers 212r, 212g, and 212b, of around 0.5 μm to 2.0 μm in thickness. Here, patterning is performed for the colored layers so as to mutually be overlaid in the inter-pixel areas, thereby forming an overlaying shielding layer 212BM where multiple (three in the example in the drawing) colored layers are overlaid.

In the colored layer forming step, a material with high leveling properties are used as the photosensitive resin, and this is applied with a method whereby smoothness is readily obtained, such as spin coating. As a result, the surface of the colored layers is formed practically smooth within the pixel. The transmissive layer 214 is partially formed with each of the colored layers thus formed, and thick portions 212TH are provided in regions corresponding to the openings 211a of the reflective layer 211, which are non-formation areas of the transmissive layer 214 in each pixel.

The color filter substrate thus formed is formed so that the surface is approximately smooth, by an unshown protective layer 212p being formed. Subsequently, the liquid crystal display panel 200 shown in FIG. 1 is formed using the substrate 201 which is this color filter substrate.

With regard to manufacturing of the liquid crystal display panel 200 shown in FIG. 1, a transparent electro-conductive material is coated by sputtering on the color filter 212 formed on the substrate 201 as described above, and transparent electrodes 213 are formed by patterning using known photo-lithography. Subsequently, an alignment film of polyimide resin or the like is formed on the transparent electrodes 213, and subjected to rubbing processing and the like.

Next, the substrate 201 and substrate 202 are adhered one to another by a seal material 203, thereby configuring a panel configuration. At this time, transparent electrodes 221 and an alignment film or the like similar to that described above is already formed on the surface of the substrate 202. The substrate 201 and substrate 202 are applied one to another with approximately a predetermined inter-substrate spacing, by unshown spacers scattered and distributed between the substrates, or spacers or the like mixed into the seal material 203.

Subsequently, liquid crystal 204 is poured in from an unshown opening of the seal material 203, and the opening of the seal material 203 is closed by a sealing material such as an ultraviolet ray curing resin or the like. Thus, following completion of the primary panel structures, the phase difference plates 205 and 207, and the polarizing plates 206 and 208 are attached to the outer face of the substrates 201 and 202 by adhesion or the like.

With this embodiment, due to the transmissive layer 214 being formed on the reflective layer 211, the reflective layer can be protected during the cleansing step and developing step and the like in the manufacturing steps, so corrosion and soiling of the reflective layer can be prevented.

Figure 21:
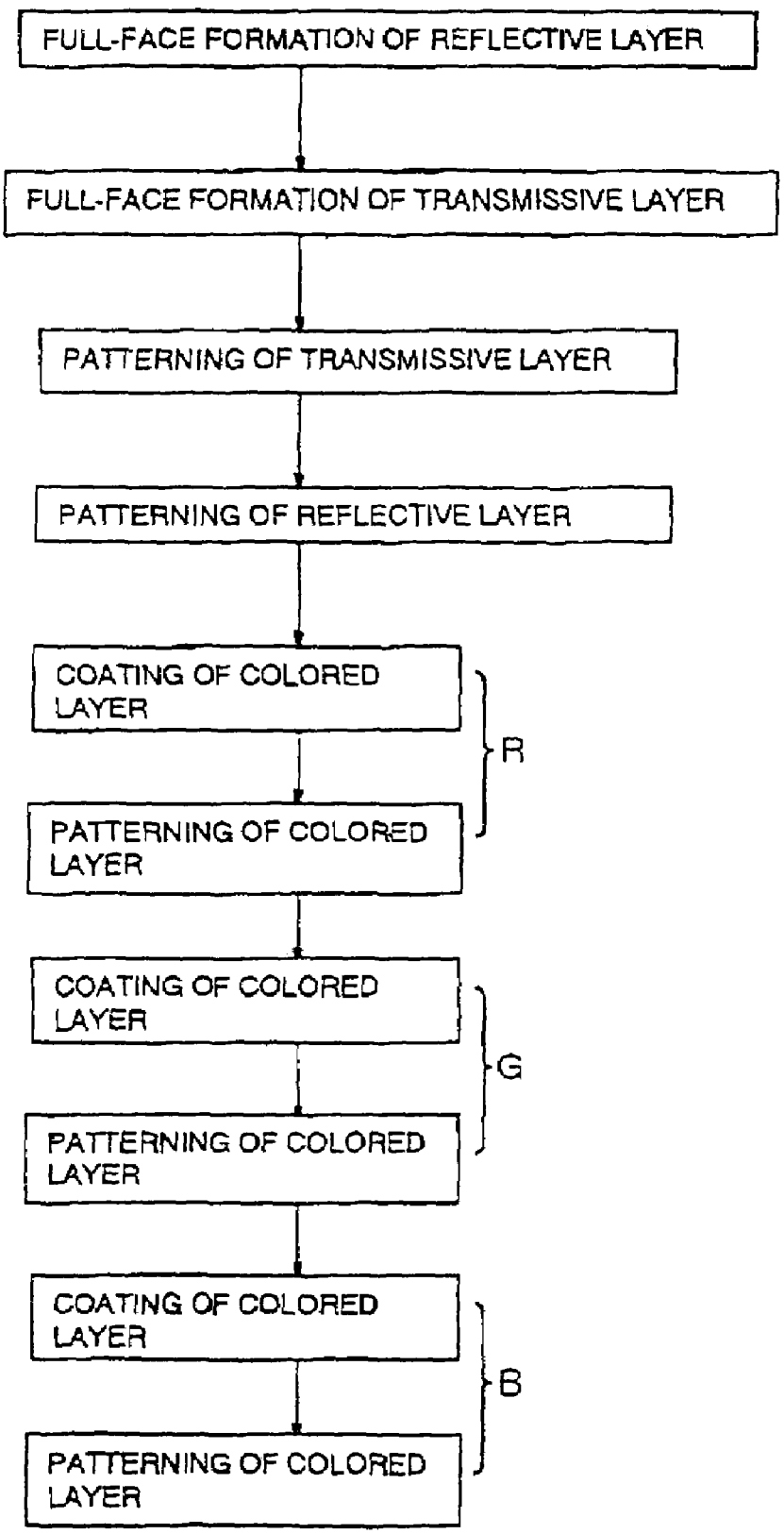
FIG. 21 is a schematic flowchart illustrating the overall process of a modification of the manufacturing method for the color filter substrate according to the seventh embodiment.

Next, a modification of the manufacturing method for manufacturing the same structure as above will be described with reference to FIG. 21. In this manufacturing method, first, a reflective material for forming the reflective layer 211 is coated on the entire face of the substrate 201, following which a transmissive material for forming the transmissive layer 214 is coated on the entire face of the reflective material. Thus, the reflective material and transmissive material are layered on the entire face of the substrate 201. In this state, the transmissive material on the upper layer is selectively removed by etching or the like using known photo-lithography or the like so as to form the transmissive layer 214, and next, the portion of the reflective material which has been exposed with the transmissive material removed is removed by etching or the like so as to form the reflective layer 211 having openings 211a. Subsequently, coating and patterning of the colored layer is repeated in the same way for each color, forming the colored layer. Note that at the time of patterning the reflective material, the transmissive layer 214 itself may be used as a mask for etching.

According to this method, the patterning of the reflective layer 211 and transmissive layer 214 can be performed using a mask formed in a common photo-lithography step, and accordingly this method is advantageous in that the number of steps can be reduced.

Eighth Embodiment

Next, with reference to FIG. 9, the method for manufacturing a color filter substrate as an eighth embodiment according to the present invention will be described. First, with this embodiment, as shown in FIG. 9(a), a foundation layer 214' around 0.5 μm to 2.5 μm in thickness is partially formed on the substrate 201. Openings 214a' are formed in the foundation layer 214' for each pixel.

Next, as shown in FIG. 9(b), a reflective layer 211' around 50 nm to 250 nm in thickness is formed on the foundation layer 214'. Openings 211a' are formed in the reflective layer 211' so as to correspond to the openings 214a' of the foundation layer 214'.

Subsequently, as shown in FIG. 9(c), the colored layers 212r, 212g, and 212b, around 0.5 μm to 2.0 μm in thickness are formed on the surface of the substrate 201 and the reflective layer 211, as with the sixth embodiment. At this time, the overlaying shielding portion 212BM and the thick portion 212TH are also formed in the same manner.

Though the foundation layer 214' can be formed with the same material and the same method as with the transmissive layer, it is not necessary to have transparency, and a light shielding material may be used.

A liquid crystal display panel approximately the same as with the sixth embodiment can be configured with the color filter substrate formed according to this embodiment. In this case, a liquid crystal display panel having a structure wherein the foundation layer is formed between the substrate 201 and the reflective layer 211 can be formed, instead of the transmissive layer 214 of the liquid crystal display device 200 shown in FIG. 1. In the same way, a liquid crystal display panel having a structure wherein the foundation layer is formed between the substrate 601 and the reflective layer 611 can be formed, instead of the liquid crystal display device 600 of the fifth embodiment shown in FIG. 5.

In the event of forming a liquid crystal display panel using the color filter substrate according to the present embodiment, this is performed in the same way as with the seventh embodiment.

With this embodiment as well, manufacturing can be performed with the same process as the modification of the seventh embodiment described with reference to FIG. 21. That is to say, a foundation material is covered on the entire surface of the substrate 201 as a first step for forming the foundation layer 214', and next, a reflective material for forming the reflective layer 211' is coated on the entire surface of the foundation material. Thus, the foundation material and reflective material are layered on the entire face of the substrate 201. In this state, the reflective material on the upper layer is selectively removed by etching or the like using known photo-lithography or the like so as to form the reflective layer 211' having the openings 211a', and next, the portion of the foundation material which has been exposed with the reflective material removed is removed by etching or the like so as to form the foundation layer 214'. Subsequently, coating and patterning of the colored layer is repeated in the same way for each color, forming the colored layer. Note that at the time of patterning the foundation material, the reflective layer 211' itself may be used as a mask for etching.

According to this method, the patterning of the foundation layer 214' and reflective layer 211' can be performed using a mask formed in a common photo-lithography step, and accordingly this method is advantageous in that the number of steps can be reduced.

Ninth Embodiment

Next, the method for manufacturing a color filter substrate as a ninth embodiment according to the present invention will be described with reference to FIG. 10. This embodiment is a method for manufacturing a color filter substrate equivalent to the substrate 301 used in the liquid crystal display panel 300 according to the second embodiment shown in FIG. 2.

With this embodiment, first, as shown in FIG. 10(a), recessed portions 301a around 0.5 μm to 2.5 μm are formed on the substrate 301. These recessed portions 301a can be formed by forming a mask of unshown resist or the like on the surface of the substrate 301, and selectively etching the substrate 301 by wet etching using a hydrofluoric acid etching fluid or the like.

Next, as shown in FIG. 10(b), a reflective layer 311 around 50 nm to 250 nm in thickness is formed on the surface of the substrate 301, in the same way as with the sixth and seventh embodiments. Openings 311a are provided on the reflective layer 311 at the formation regions of the recessed portions 301a, by photo-lithography or the like.

Subsequently, the colored layers 312r, 312g, and 312b, around 0.50 μm to 2.0 μm in thickness are formed on the reflective layer 311 and the recessed portions 301a, in the same way as with the above embodiments. Thick portions 312TH formed thicker than other portions are formed for each of the colored layers, at the portions immediately above the recessed portions 301a.

In the event of forming a liquid crystal display panel using the color filter substrate according to the present embodiment, this is performed in the same way as with the seventh embodiment.

Tenth Embodiment

Next, the method for manufacturing a color filter substrate as a ninth embodiment according to the present invention will be described with reference to FIG. 11. With this embodiment, first, as shown in FIG. 11(a), recessed portions 301a' around 0.5 μm to 2.5 μm are formed on the substrate 301 as with the eighth embodiment, and next, a reflective layer 311 around 50 nm to 250 nm in thickness is formed on the surface of the substrate 301. Openings 311a are provided on the reflective layer 311 at portions corresponding to the recessed portions 301a'.

Next, as shown in FIG. 11(b), a transmissive layer 314 around 0.5 μm to 2.5 μm in thickness is formed on the surface of the reflective layer 311'. The transmissive layer 314 is formed with the same material and same method as in the sixth embodiment and seventh embodiment. Openings 314a are provided on the transmissive layer 314 at portions corresponding to the recessed portions 301a' and the openings 311a of the reflective layer 311, at portions immediately above.

Subsequently, the colored layers 312r, 312g, and 312b, around 0.50 μm to 2.0 μm in thickness are formed on the transmissive layer 314 and the recessed portions 301a', in the same way as with the above embodiments. Thick portions 312TH thicker than the other portions are formed for the colored layers, due to the openings 311a of the reflective layer 311 and the openings 314a of the transmissive layer 314 being formed.

Though a step for forming the recessed portions 301a' and a step for forming the transmissive layer 314 must both be provided with the present embodiment, the depth of the recessed portions 301a' and the thickness of the transmissive layer 314 can each be reduced. In other words, the thickness of the thick portions 312TH of the colored layer can be readily formed thick. Also, the reflective layer 311 can be protected with the transmissive layer 314, yielding the advantage that the reflective layer can be protected during the cleansing step and developing processing in the manufacturing steps, so corrosion and soiling of the reflective layer can be prevented.

In the event of forming a liquid crystal display panel using the color filter substrate according to the present embodiment, this is performed in the same way as with the seventh embodiment.

Eleventh Embodiment

Next, the method for manufacturing a color filter substrate as an eleventh embodiment according to the present invention will be described with reference to FIG. 12. With this embodiment, recessed portions 301a' around 0.5 μm to 2.5 μm are formed on the substrate 301 as with the eighth embodiment, and next, a foundation layer 314' around 0.5 μm to 2.5 μm in thickness as with the seventh embodiment is formed at portions excluding the recessed portions 301a'. Subsequently, a reflective layer 311' around 50 nm to 250 nm in thickness is formed on the surface of the foundation layer 314'.

With this embodiment, openings 314a' of the foundation layer 314' are formed immediately above the recessed portions 301a', and openings 311a' of the reflective layer 311' are formed further above these. Above these are formed the colored layers 312r, 312g, and 312b, around 0.5 μm to 2.0 μm in thickness are in the same way as with the ninth embodiment. Thick portions 312TH thicker than the other portions are formed for the colored layers, due to the recessed portions 301a', openings 314a', and openings 311a'.

In the event of forming a liquid crystal display panel using the color filter substrate according to the present embodiment, this is performed in the same way as with the seventh embodiment.

Twelfth Embodiment

Figure 13:
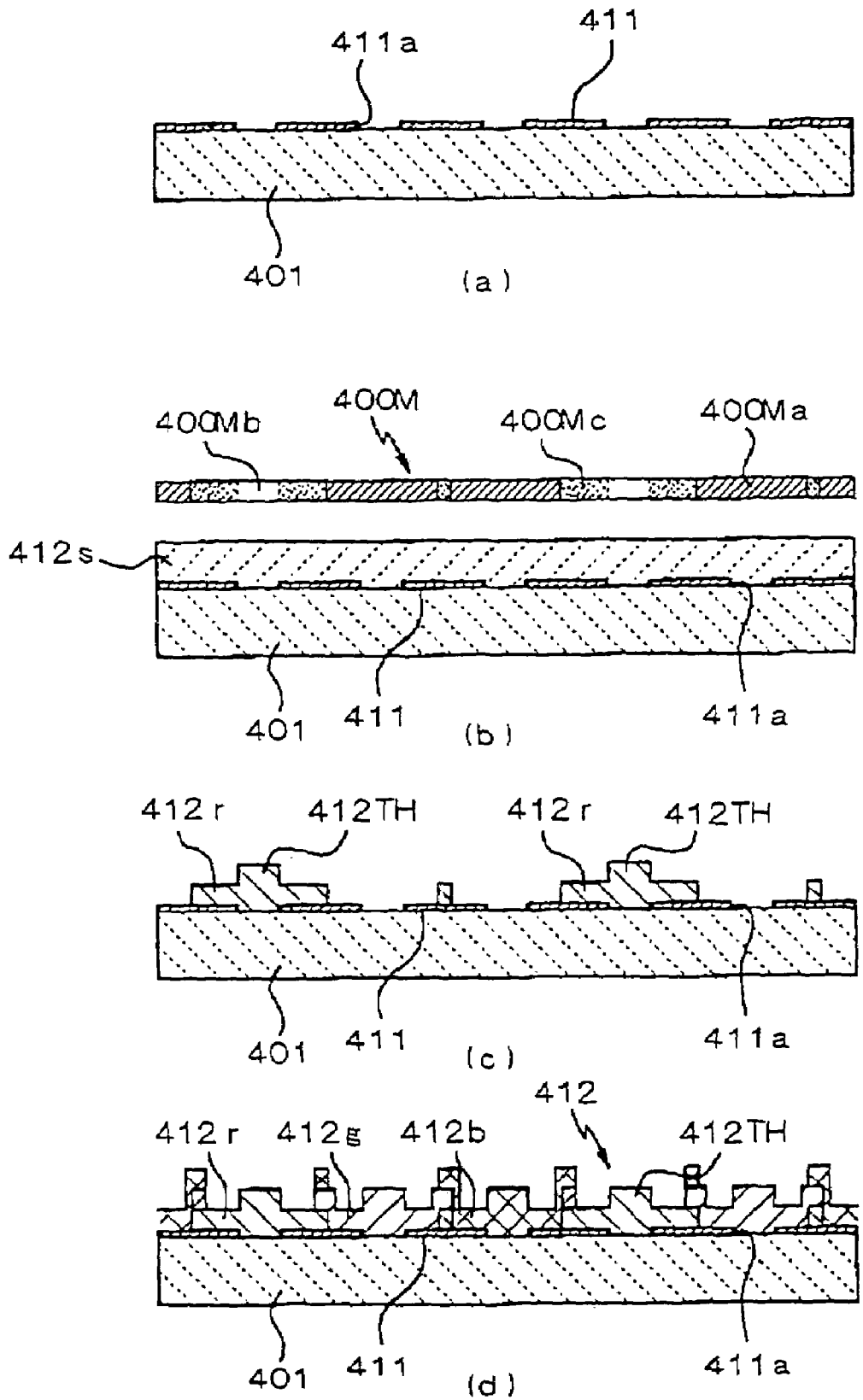
FIG. 13 is schematic process drawings (a) through (d) illustrating the manufacturing method of a color filter substrate according to a twelfth embodiment of the present invention, in model fashion.

Next, a method for manufacturing a color filter substrate according to a twelfth embodiment of the present invention will be described with reference to FIG. 13. This embodiment relates to the manufacturing method of the color filter substrate (substrate 401) making up the liquid crystal panel 400 according to the third embodiment.

As shown in FIG. 13(a), with the present embodiment, a reflective layer 411 of a thickness of around 50 nm to 250 nm having openings 411a is formed on the substrate 401, and next, photosensitive resin 412s exhibiting a predetermined hue is coated thereupon. In this state, patterning is performed by exposing the photosensitive resin 412s with a predetermined pattern using a semi-transmissive mask 400M as shown in FIG. 13(b), thereby sequentially forming a colored layer 412r as shown in FIG. 13(c).

Now, the semi-transmissive mask 412 comprises shielding portions 400Ma which essentially shield the irradiated light corresponding to the exposure pattern, transmitting portions 400Mb which essentially allow transmission of irradiated light, and semi-transmitting portions 400Mc set so that the transmissivity of the irradiated light is between that of the shielding portions 400Ma and the transmitting portions 400Mb. A mask comprising such shielding portions 400Ma, transmitting portions 400Mb, and semi-transmitting portions 400Mc, capable of controlling the amount of exposure, can be configured of a half-tone mask or phase-difference mask.

Upon performing the developing processing following the above exposing step, the colored layer 412r is formed so as to remain at the regions other than the shielding portions 400Ma, i.e., at regions corresponding to the transmitting portions 400Mb and semi-transmitting portions 400Mc, in the event that photo-curing photo-sensitive resin is used for example, as shown in FIG. 13(c), and thick portions 412TH are provided at regions corresponding to the transmitting portions 400Mb.

As shown in FIG. 13(d), in the same way as described above, the colored layers 412g and 412b are formed each having thick portions 412TH, by using the semi-transmissive masks for the other colored layers 412g and 412b, as well. Note that the colored layers 412r, 412g, and 412b are each formed on the reflective layer 411 to be around 0.5 μm to 2.0 μm in thickness, and the thick portions 412TH are formed so as to be higher than the surrounding colored layers by around 0.5 μm to 2.0 μm.

In the event of forming a liquid crystal display panel using the color filter substrate according to the present embodiment, this is performed in the same way as with the seventh embodiment.

Though the present embodiment has thick portions provided at a part of the colored layer by changing the degree of photosensitivity of the photosensitive region, but the same structure can be configured with a colored layer of a two-layer structure. That is to say, an arrangement may be made wherein a second layer of the colored layer is formed after a first layer is formed, and the thick portions are formed by configuring such that the first layer and the second layer partially overlap. In this case, formation may be made wherein the first layer is a normal colored layer and the second layer is restricted to the thick portions, or conversely, the first layer may be formed restricted to the thick portions alone, with a second layer formed upon.

Thirteenth Embodiment

Figure 14:
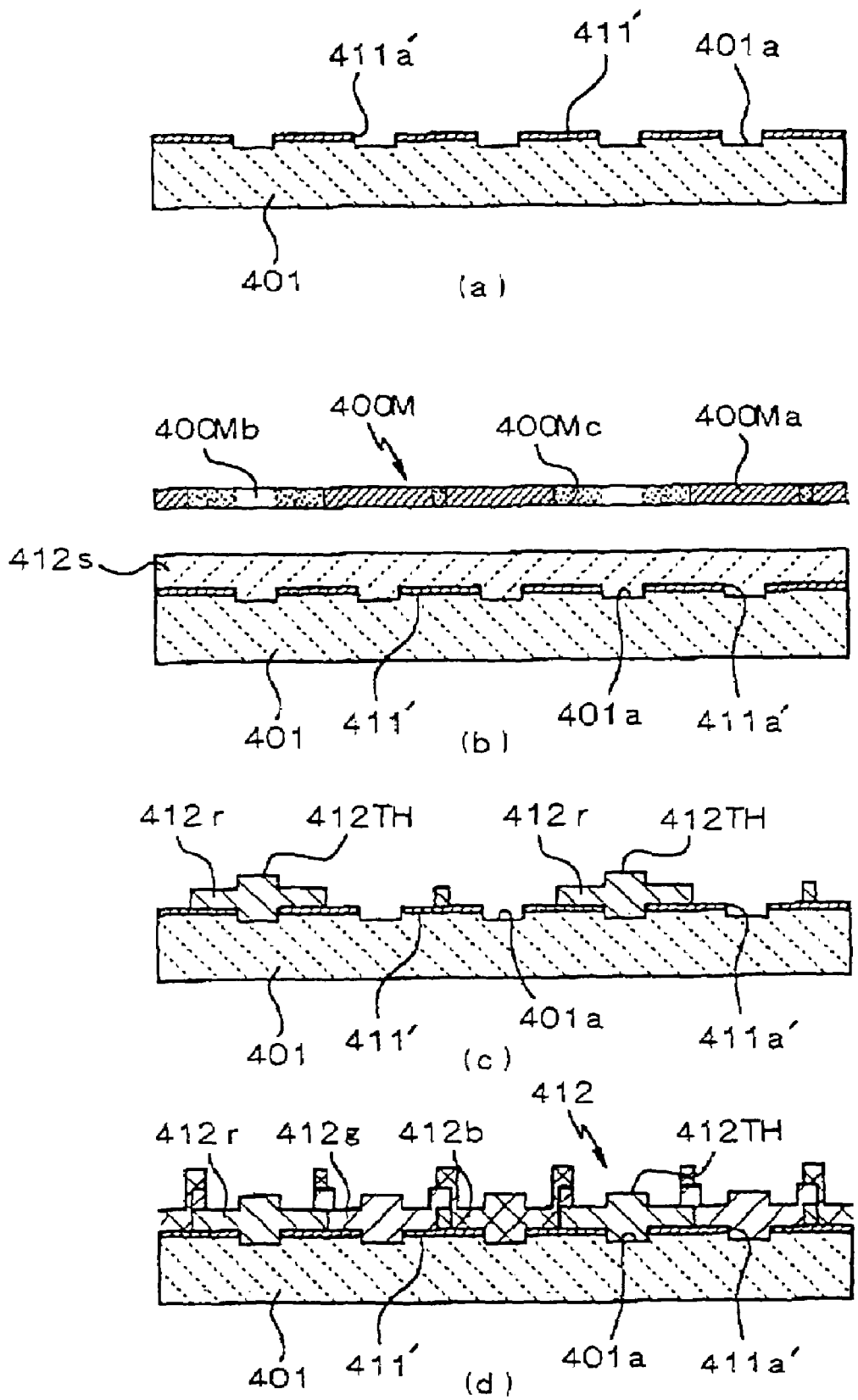
FIG. 14 is schematic process drawings (a) through (d) illustrating the manufacturing method of a color filter substrate according to a thirteenth embodiment of the present invention, in model fashion.

Next, a method for manufacturing a color filter substrate according to a thirteenth embodiment of the present invention will be described with reference to FIG. 14. As shown in FIG. 14(a), with this embodiment, recessed portions 401a around 0.5 μm to 2.5 μm are formed on the substrate 401, and subsequently, a reflective layer 411' around 50 nm to 250 nm in thickness is formed at portions avoiding the recessed portions 401a. At this time, the openings 411a' of the reflective layer 411' are arrayed immediately above the recessed portions 401a.

Next, as shown in FIG. 14(b), photosensitive resin 412s exhibiting a predetermined hue is coated upon the substrate 401 and the reflective layer 411', and exposure is performed using a semi-transmissive mask 400M the same as with the twelfth embodiment. Then, as shown in FIG. 14(c), performing developing processing forms a colored layer 412r. Further, as shown in FIG. 14(d), the colored layers 412g and 412b of other hues are formed in the same manner as with the colored layer 412r. Thick portions 412TH are provided at regions immediately above the recessed portions 401a for each colored layer. Note that the colored layers 412r, 412g, and 412b are each formed on the reflective layer 411 to be a thickness of around 0.5 μm to 2.0 μm, and also the thick portions 412TH are formed so as to be higher than the surrounding colored layers by around 0.5 μm to 2.0 μm.

With this embodiment, the amount of protrusion of the thick portions 412TH from the surface of the colored layers can be reduced while insuring the thickness of the thick portions 412TH by forming the recessed portions 401a.

In the event of forming a liquid crystal display panel using the color filter substrate according to the present embodiment, this is performed in the same way as with the seventh embodiment.

Fourteenth Embodiment

Figure 15:
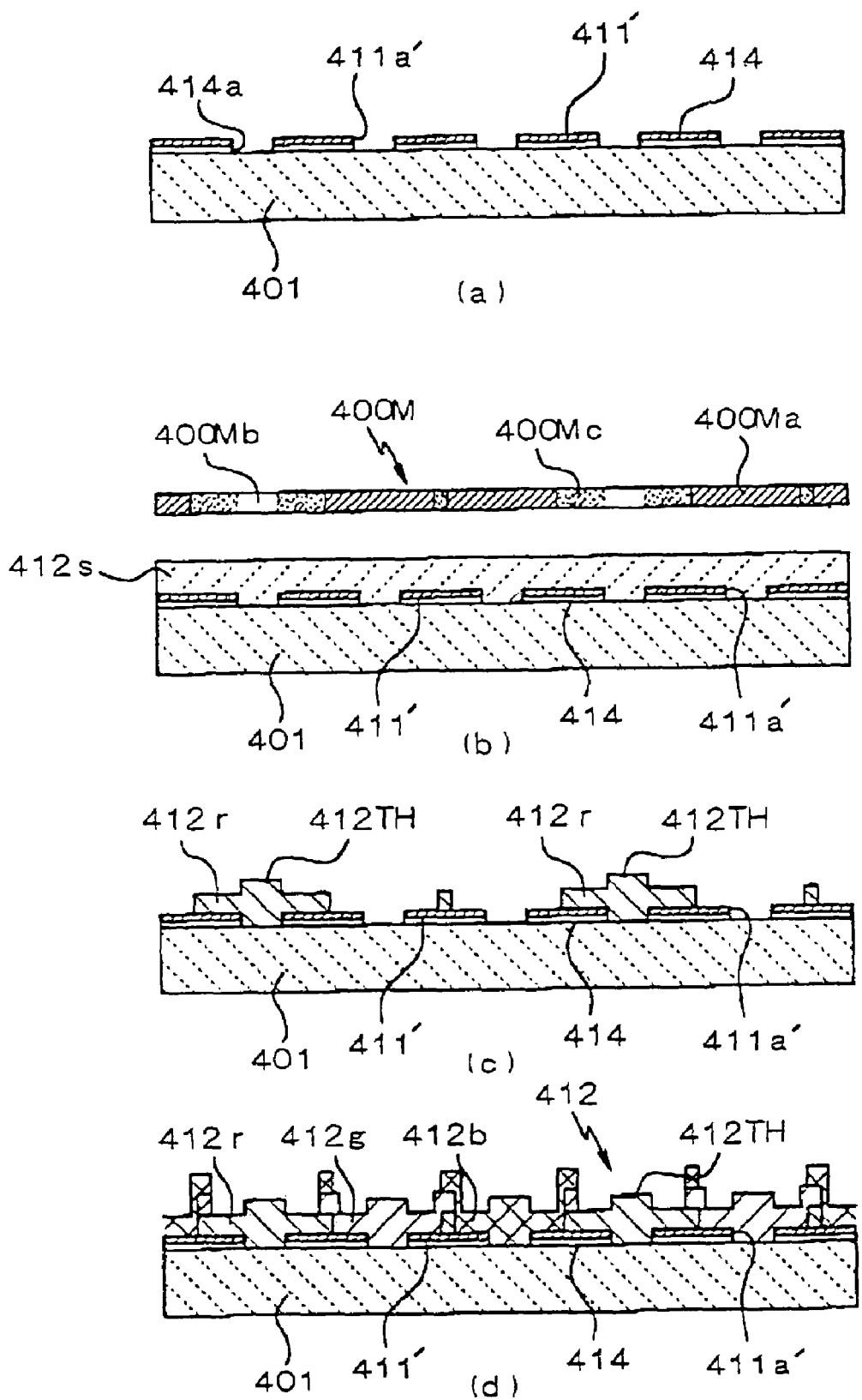
FIG. 15 is schematic process drawings (a) through (d) illustrating the manufacturing method of a color filter substrate according to a fourteenth embodiment of the present invention, in model fashion.

Next, with reference to FIG. 15, the method for manufacturing a color filter substrate according to a fourteenth embodiment according to the present invention will be described. First, as shown in FIG. 15(a), a foundation layer 414 around 0.5 μm to 2.5 μm in thickness is formed on the substrate 401. Openings 414a are formed in the foundation layer 414. Next, a reflective layer 411' around 50 nm to 250 nm in thickness is formed above the foundation layer 414. Openings 411a' are formed in the reflective layer 411' immediately above the openings 414a' in the foundation layer 414.

Next, as shown in FIG. 15(b), photosensitive resin 412s is coated upon the substrate 401 and the reflective layer 411', and subsequently, exposure is performed using a semi-transmissive mask 400M the same as with the twelfth embodiment. Then, as shown in FIG. 15(c), performing developing processing forms a colored layer 412r. Further, as shown in FIG. 15(d), the colored layers 412g and 412b are formed in the same manner. At this time, thick portions 412TH are formed in the colored layer at portions immediately above the openings 414a of the foundation 414 and openings 411a' of the reflective layer 411'. Note that the colored layers 412r, 412g, and 412b are each formed on the reflective layer 411 to be a thickness of around 0.5 μm to 2.0 μm, and also the thick portions 412TH are formed so as to be higher than the surrounding colored layers by around 0.5 μm to 2.0 μm.

With the color filter substrate formed thus, the amount of protrusion of the thick portions 412TH can be reduced while insuring the thickness of the thick portions 412TH, by the bottom face of the color layers other than the portions within the openings 414a being raised by an amount equivalent to the thickness of the foundation layer 414.

Also, in the event of forming a liquid crystal display panel using the color filter substrate according to the present embodiment, this is performed in the same way as with the seventh embodiment.

Fifteenth Embodiment

Figure 16:
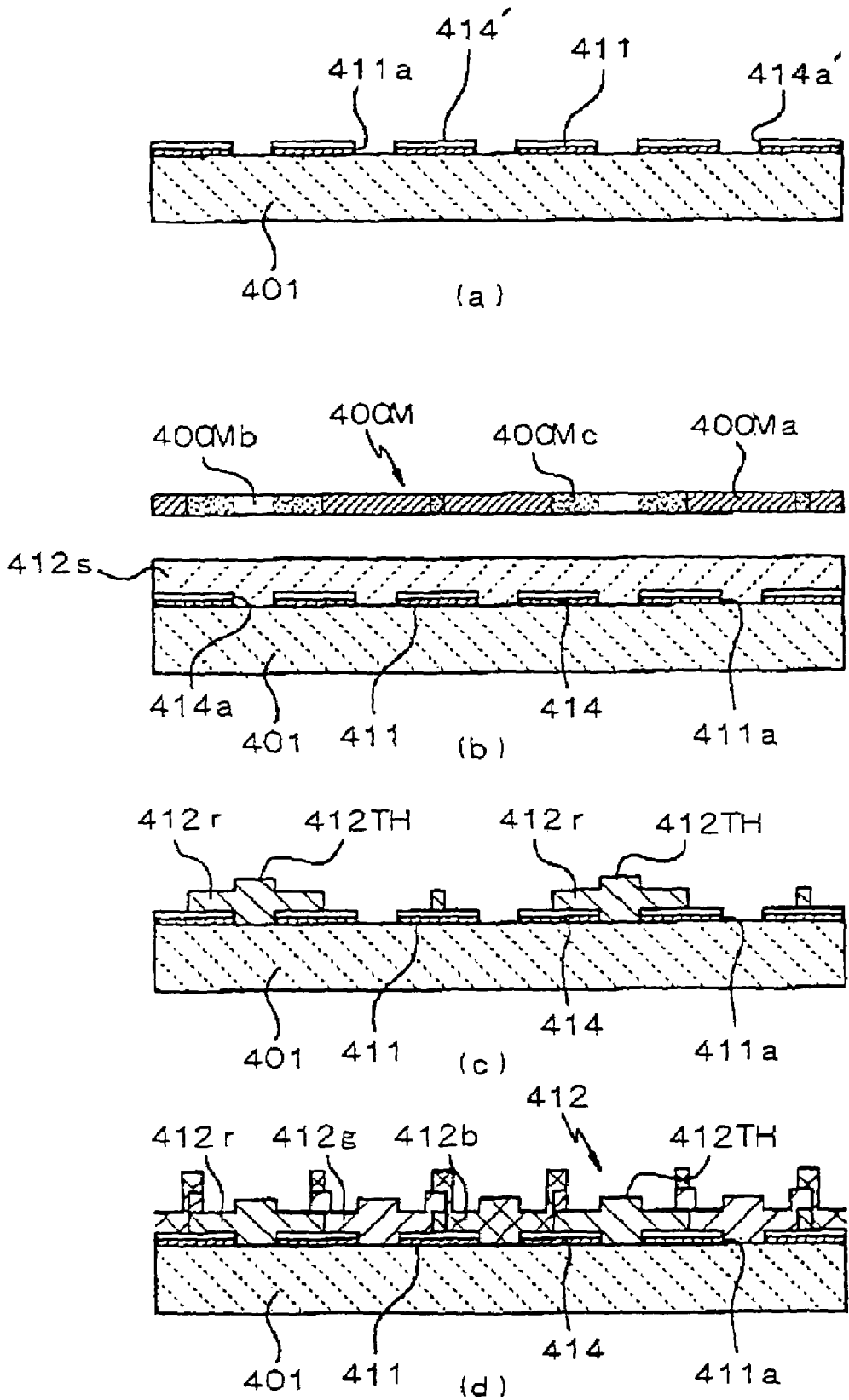
FIG. 16 is schematic process drawings (a) through (d) illustrating the manufacturing method of a color filter substrate according to a fifteenth embodiment of the present invention, in model fashion.

Next, a method for manufacturing a color filter substrate according to a fifteenth embodiment of the present invention will be described with reference to FIG. 16. As shown in FIG. 16(a), with the present embodiment, a reflective layer 411 of a thickness of around 50 nm to 250 nm having openings 411 a is formed on the substrate 401, and next, as shown in FIG. 16(b), a transmissive layer 414' around 0.5 μm to 2.5 μm in thickness is formed on the surface of the reflective layer 411. Now, the transmissive layer 414' has openings 414a' at portions corresponding to the openings 411a of the reflective layer 411.

Next, as shown in FIG. 16(b), photosensitive resin 412s exhibiting a predetermined hue is coated thereupon, and subsequently, exposure is performed using a semi-transmissive mask 400M the same as with the twelfth embodiment. Then, as shown in FIG. 16(c), performing developing processing forms a colored layer 412r. Now, thick portions 412TH are formed at regions overlaying the openings 411a of the reflective layer 411 and the openings 414a' of the transmissive layer 414'. Finally, as shown in FIG. 16(d), the colored layers 412g and 412b of other hues are sequentially formed in the same manner as described above. Note that the colored layers 412r, 412g, and 412b are each formed on the transmissive layer 414' to be a thickness of around 0.5 μm to 2.0 μm, and also the thick portions 412TH are formed so as to be higher than the surrounding colored layers by around 0.5 μm to 2.0 μm.

Also, in the event of forming a liquid crystal display panel using the color filter substrate according to the present embodiment, this is performed in the same way as with the seventh embodiment.

Sixteenth Embodiment

Figure 17:
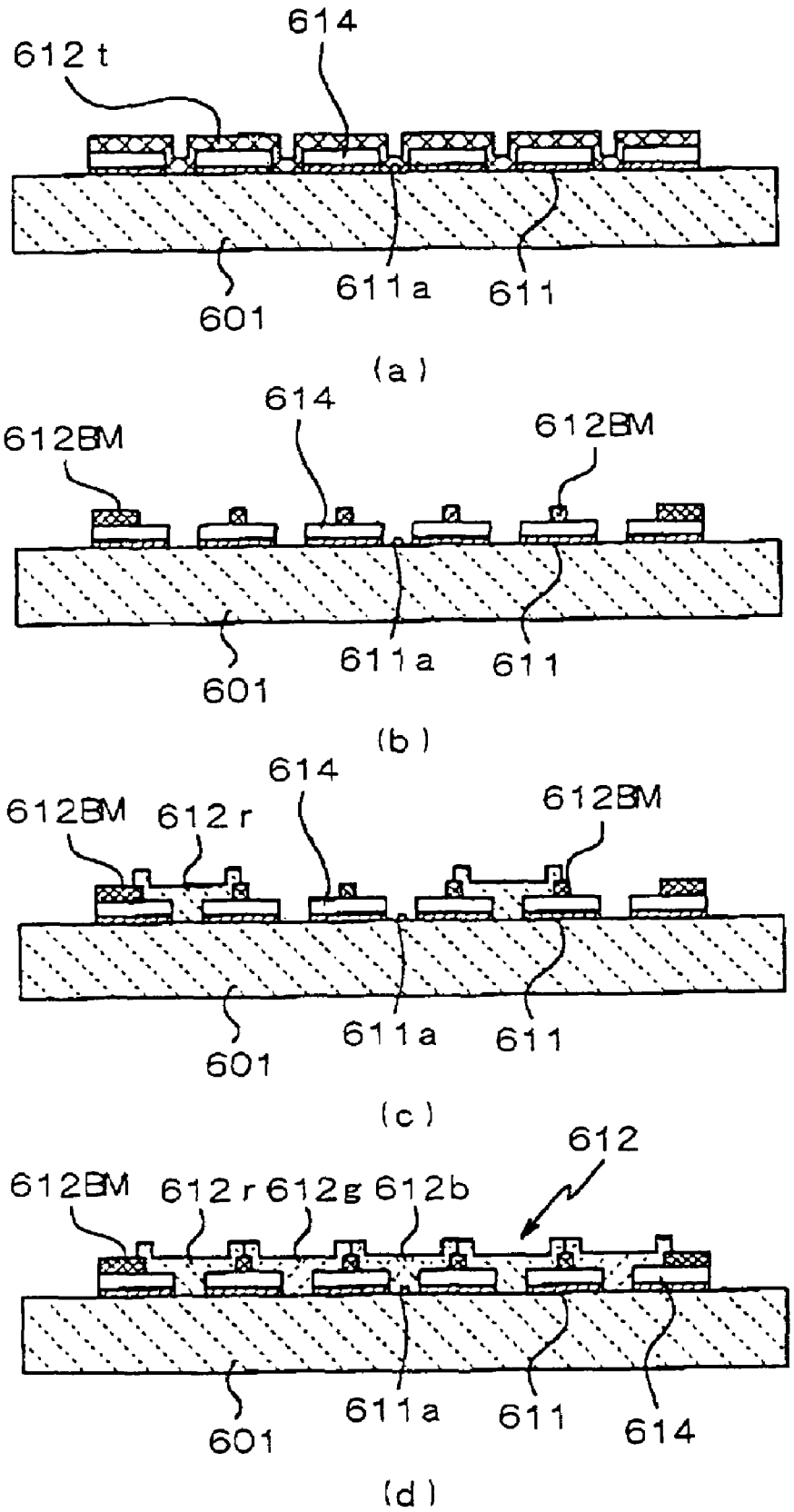
FIG. 17 is schematic process drawings (a) through (d) illustrating the manufacturing method of a color filter substrate according to a sixteenth embodiment of the present invention, in model fashion.

Next, a method for manufacturing a color filter substrate according to a sixteenth embodiment of the present invention will be described with reference to FIG. 17. This embodiment relates to the manufacturing method of the color filter substrate (substrate 601) making up the liquid crystal display panel 600 according to the sixth embodiment shown in FIG. 5.

First, as shown in FIG. 17(a), a reflective layer 611 of a thickness of around 50 nm to 250 nm having openings 611a is formed on the surface of the substrate 601, and subsequently, a transmissive layer 614 around 0.5 μm to 2.5 μm in thickness is formed on the surface of the reflective layer 611. The transmissive layer 614 has openings 614a above the openings 611a of the reflective layer 611.

Next, as shown in FIG. 17(b), a black shielding layer 612BM around 0.5 μm to 2.5 μm in thickness is formed on the substrate 601 and the transmissive layer 614. More specifically, black photosensitive resin 612s is coated as shown in FIG. 17(a), which is patterned by exposing with a predetermined pattern and developing.

Next, as shown in FIG. 17(c), the colored layer 612r is formed by the same steps as with the twelfth embodiment (exposing and developing steps using the semi-transmissive mask), and further, the colored layers 612g and 612b exhibiting the other hues are sequentially formed in the same manner, as shown in FIG. 17(d). Due to the color layer thus formed having the transmissive layer 614 partially formed, the thick portions 612TH are provided directly above the openings 611a of the reflective layer 611.

With this embodiment, the transmissive layer 614 is formed on the reflective layer 611, and the black shielding layer 612BM is formed on the transmissive layer 614. Now, conventionally, in the event of directly forming the black shielding layer 612BM on the reflective layer formed of metal, there is known a problem wherein residue of the black resin adheres to regions wherein the black resin should be removed during patterning of the black resin, this residue causing deterioration in brightness of the color filter. However, with the present embodiment, the black shielding layer 612BM is formed on the transmissive layer 614 covering the reflective layer 611, so residue of the black resin does not readily occur, and an excellent and bright color filter 612 can be formed.

Also, in the event of forming a liquid crystal display panel using the color filter substrate according to the present embodiment, this is performed in the same way as with the seventh embodiment.

With the present embodiment, a black shielding layer is formed instead of the overlaying shielding layer of the above-described embodiments, and is configured so as to reduce the thickness of the color filter, and improve the smoothness of the surface of the color filter. This black shielding layer can be used instead of the overlaying shielding layer of the first embodiment through the fourth embodiment and the sixth embodiment through the fifteenth embodiment.

OTHER EMBODIMENTS

Figure 18:
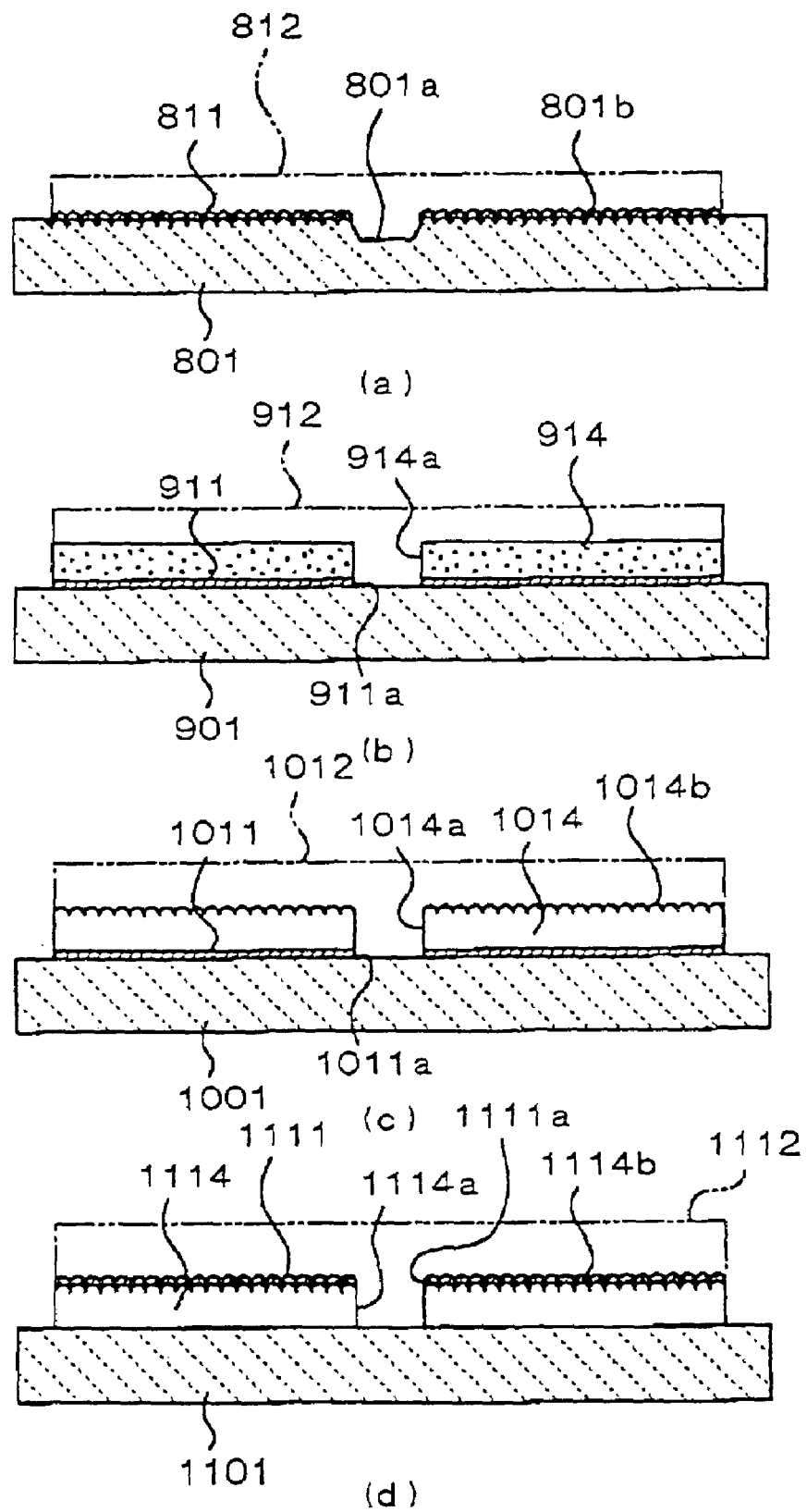
FIG. 18 is schematic partial cross-sectional diagrams (a) through (d) illustrating other configuration examples applicable to the above embodiments, in model fashion.

Finally, other configuration examples which can be used in the above-described embodiments will be described with reference to FIG. 18.

In the configuration example illustrated in FIG. 18(a), recessed portions 801a around 0.5 μm to 2.5 μm in depth are formed on the surface of the substrate 801, while fine patterned indentations 801b are formed on the surface other than the recessed portions 801a, and a reflective layer 811 of a thickness of around 50 nm to 250 nm is formed on the fine patterned indentations 801b. An opening 811a is provided to the reflective layer 811 at the region of the recessed portions 801a. Overall fine patterned indentations are formed on the reflective layer 811 due to being formed on the patterned indentations 801b. Accordingly, the reflected light reflected by the reflective layer 811 is scattered to a suitable degree, so in the event that a liquid crystal display panel is configured, blinding from illumination light or sunlight with reflective display, picking up surrounding scenery, etc., can be prevented.

Now, the patterned indentations 801b can be formed to a surface coarseness suitable for scattering light by selecting the formula for an etching fluid such as hydrofluoric acid or the like beforehand, and etching, using this etching fluid. Also, these may be formed by forming a mask using photolithography, and executing etching through this mask.

With this configuration example, the colored layer 812 of the color filter is formed on the recessed portions 801a and the reflective layer 811, so thick portions can be provided at the portions where the recessed portions 801 are formed even in the event that the surface of the colored layer 812 is formed approximately flat.

This configuration example can be applied to, of the above embodiments, those wherein recessed portions are formed on the surface of the substrate, and the reflective layer is formed directly on the substrate surface. Also, the structure of the patterned indentations 801b and the reflective layer 811 alone can be applied for embodiments wherein the recessed portions are not provided, as well.

With the configuration example shown in FIG. 18(b), a reflective layer 911 of a thickness of around 50 nm to 250 nm having openings 911a is formed on a substrate 901, and a transmissive layer 914 around 0.5 μm to 2.5 μm in thickness is formed on the reflective layer 911. The openings 914a of the transmissive layer 914 is formed upon the openings 911a of the reflective layer 911, corresponding thereto. The colored layer 912 of the color filter is then formed upon the transmissive layer 914 at a thickness of around 0.5 μm to 2.0 μm. The colored layer 912 has thick portions provided at regions corresponding to the openings 914a of the transmissive layer 914 and the openings 911a of the reflective layer 911.

With this configuration example, fine particles with a different light refraction from the material of the transmissive layer 914 are dispersed and disposed within the transmissive layer 914. Accordingly, both the light heading toward the reflective layer 911 and the light reflected from the reflective layer 911 are scattered at the transmissive layer 914, so blinding or picking up surrounding scenery, etc., in reflective display can be reduced, as with the above configuration example.

Incidentally, this configuration example can be applied to all embodiments of the above embodiments having a transmissive layer on a reflective layer.

With the configuration example shown in FIG. 18(c), a reflective layer 1011 around 50 nm to 250 nm having openings 1011a is formed on a substrate 1001, and a transmissive layer 1014 around 0.5 μm to 2.5 μm in thickness is formed on the reflective layer 1011. The openings 1014a of the transmissive layer 1014 are formed upon the openings 1011a of the reflective layer 1011, corresponding thereto. The colored layer 1012 of the color filter is then formed upon the transmissive layer 1014 at a thickness of around 0.5 μm to 2.0 μm.

The colored layer 1012 has thick portions provided at regions corresponding to the openings 1014a of the transmissive layer 1014 and the openings 1011a of the reflective layer 1011.

With this configuration example, fine patterned indentations 1014b are formed on the surface of the transmissive layer 1014, so both the light heading toward the reflective layer 1011 and the light reflected from the reflective layer 1011 are scattered by the patterned indentations 1014b. Accordingly, blinding, picking up surrounding scenery, etc., in reflective display, can be reduced with this configuration example as well. As methods for forming the patterned indentations 1014b, in addition for the etching method described in the description portion of the configuration example shown in FIG. 18(a), there are methods for patterning the material disposed on the substrate with a predetermined cycle so as to form a cyclic structure, and softened by heating, so as to provide with a suitable degree of fluidity, and thereby forming patterned indentations, and so forth. Incidentally, this configuration example can be applied to all embodiments of the above embodiments having a transmissive layer on a reflective layer.

With the configuration example shown in FIG. 18(d), a foundation layer 1114 around 0.5 μm to 2.5 μm in thickness having openings 1114a is formed on a substrate 1101, fine patterned indentations 1114b are formed on the surface of the foundation layer 1114, and a reflective layer 1111 around 50 nm to 250 nm is formed thereupon. The reflective layer 1111 has openings 1111a formed immediately above the foundation layer 1114a. Now, the patterned indentations 1114b of the foundation layer 1114 can be formed with the same method as the patterned indentations forming method with regard to the transmissive layer shown in FIG. 18(c). The colored layer 1112 of the color filter is then formed upon the reflective layer 1111 at a thickness of around 0.5 μm to 2.0 μm, and the colored layer 1112 has thick portions provided at regions corresponding to the openings 1114a of the foundation layer 1114 and the openings 1111a of the reflective layer 1111.

With this configuration example, fine patterned indentations are formed on the reflective face due to the reflective layer 1111 being formed on the patterned indentations 1114b of the foundation layer 1114, so blinding or picking up surrounding scenery, etc., can be prevented, as with the above. Incidentally, this configuration example can be applied to all embodiments of the above embodiments having a reflective layer formed on a foundation layer.

Electronic Equipment

Figure 22:
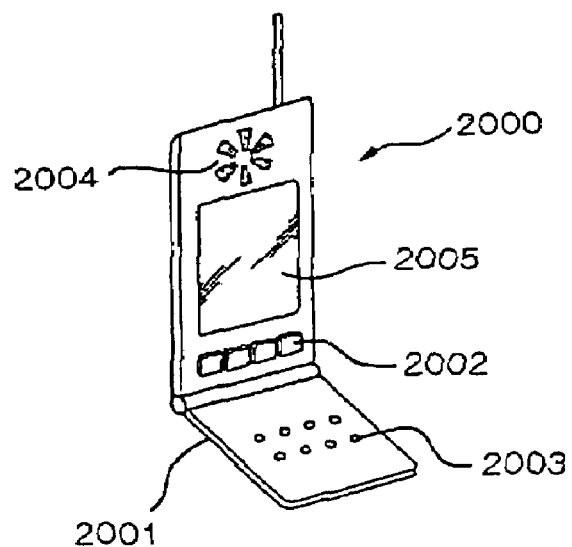
FIG. 22 is a schematic perspective diagram illustrating an external view of a cellular telephone as an example of electronic equipment comprising the electro-optical device according to the embodiments.

Finally, a specific example of electronic equipment having the electro-optical device (liquid crystal display panel) according to the above embodiments will be described. FIG. 22 is a schematic perspective view illustrating the external view of a cellular telephone 2000 as an example of electronic equipment. An operating unit 2002 having operating switches on the surface of casing 2001 is provided to the cellular telephone 2000, and also provided are an audio detecting unit 2003 including a detecting devices such as a microphone, and an audio generating unit 2004 including an audio producing device such as a speaker. A display unit 2005 is provided at a part of the casing 2001, so that a display screen of the electro-optical device according to the above embodiments disposed within can be viewed through the display unit 2005. Display signals are sent to the electro-optical device from a control unit provided within the casing 2001, and display images corresponding to the display signals are displayed.

Figure 23:
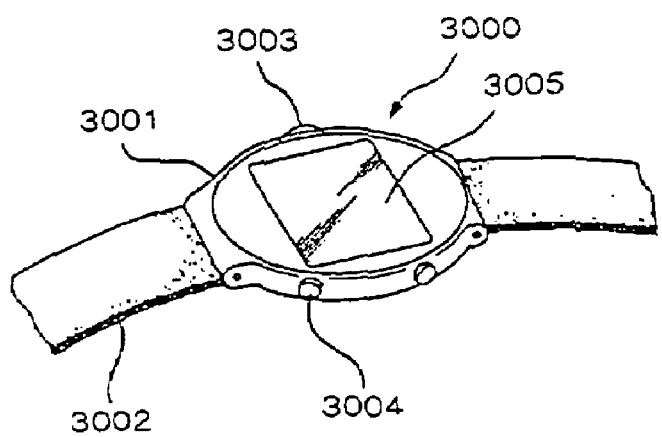
FIG. 23 is a schematic perspective diagram illustrating an external view of a clock (wristwatch) as an example of electronic equipment comprising the electro-optical device according to the embodiments.

FIG. 23 is a schematic perspective view illustrating the external view of a wristwatch 3000 as an example of the electronic equipment. The wristwatch 3000 has a watch main unit 3001 and a watch band 3002. External operating members 3003 and 3004 are provided to the watch main unit 3001. Also, a display unit 3005 is provided on the front face of the watch main unit 3001, and a display screen of the electro-optical device according to the above embodiments disposed within can be viewed through the display unit 3005. Display signals are sent to the electro-optical device from a control unit (clock circuit) provided within the watch main unit 3001, and display images corresponding to the display signals are displayed.

Figure 24:
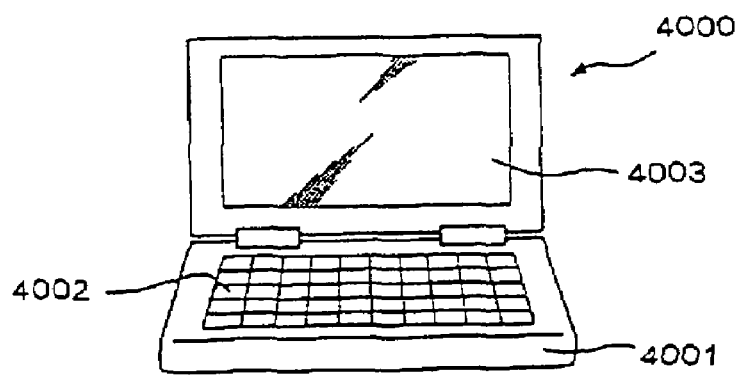
FIG. 24 is a schematic perspective diagram illustrating an external view of a computer (information terminal) as an example of electronic equipment comprising the electro-optical device according to the embodiments.

FIG. 24 is a schematic perspective view illustrating the external view of a computer device 4000 as an example of the electronic equipment. The computer device 4000 has an MPU (Micro Processor Unit) configured within a main unit 4001, and an operating unit 4002 is provided on the outer face of the main unit 4001. Also, a display unit 4003 is provided, and the electro-optical device according to the above embodiments can be stored within the display unit 4003. It is configured so that the display screen of the electro-optical device can be viewed through the display unit 4003. The electro-optical device is configured so as to receive display signals from the MPU provided within the main unit 4001, and displays images corresponding to the display signals.

Note that the color filter substrate and electro-optical device according to the present invention, the manufacturing method of the color filter substrate and the manufacturing method of the electro-optical device, and the electronic equipment are not restricted to those in the above-described illustrated examples, and it is needless to say that various modifications may be applied without departing from the spirit and scope of the present invention.

For example, in the above-described various embodiments, a passive-matrix type liquid crystal display panel has been given as an example in each case, but active-matrix liquid crystal display panels (e.g., liquid crystal display panels having TFTs (thin-film transistors) or TFDs (thin-film diodes) as switching devices) may be similarly applied as electro-optical devices according to the present invention. Also, not only liquid crystal display panels, but the present invention may also be applied to various types of electro-optical devices wherein the display state can be controlled in increments of multiple pixels, such as electro-luminescence devices, organic electro-luminescence devices, plasma display devices, and so forth.

Further, the color filter substrate according to the present invention is not restricted to the electro-optical deices, and may be used with various types of display devices, image-taking devices, and other various types of optical devices.

The invention claimed is:

1. A color filter substrate, comprising:
   a substrate;
   a reflective layer disposed on said substrate, and having a transmitting portion essentially capable of transmitting light; and
   a colored layer disposed so as to overlay at least said reflective layer in a planar manner, and having a thick portion and a convex portion;
   wherein said reflective layer has a reflecting portion on the perimeter of said transmitting portion;
   wherein said thick portion is disposed so as to overlay said transmitting portion in a planar manner;
   wherein the thickness of said thick portion is greater than the sum of the thickness of a portion of said colored layer corresponding to said reflecting portion position and the thickness of said reflecting portion and;
   wherein said convex portion projects in a direction opposite to said substrate and is disposed so as to overlay said transmitting portion in a planar manner.

2. A color filter substrate according to claim 1, wherein said transmitting portion is an opening provided on said reflective layer,
   comprising a light transmitting layer essentially capable of transmitting light between said reflective layer excluding said opening and said colored layer.

3. A color filter substrate according to claim 2, wherein said transmitting layer has scattering functions for scattering light.

4. A color filter substrate according to claim 1, wherein said transmitting portion is an opening provided to said reflective layer, having a foundation layer between said reflective layer excluding said opening and said substrate.

5. A color filter substrate according to claim 4, wherein the surface of said foundation layer has patterned indentations, and wherein said reflective layer has minute patterned indentations for scattering light.

6. A color filter substrate according to claim 1, wherein a first colored layer disposed in a first pixel has a first color, and a second colored layer disposed in a second pixel adjacent to said first pixel has a second color different from said first color, and
   wherein a portion of each of said first colored layer and said second colored layer overlaps each other in the region between said first pixel and said second pixel, and said portion of said first colored layer extends away from said substrate.

7. An electro-optical device, comprising:
   an electro-optical layer containing electro-optical material;
   a substrate supporting said electro-optical layer;
   a reflective layer disposed on said substrate, and having a transmitting portion essentially capable of transmitting light;
   a colored layer disposed so as to overlay at least said reflective layer in a planar manner, and having a thick portion and a convex portion;
   wherein said reflective layer has a reflecting portion on the perimeter of said transmitting portion;
   wherein said thick portion is disposed so as to overlay said transmitting portion in a planar manner;
   wherein the thickness of said thick portion is greater than the sum of the thickness of a portion of said colored layer corresponding to said reflecting portion position and the thickness of said reflecting portion; and
   wherein said convex portion projects toward said electro-optical layer and is disposed so as to overlay said transmitting portion in a planar manner.

8. The electro-optical device of claim 7 which further comprises:

a pair of opposed substrates, on substrate supporting the electro-optical material and the other substrate having the colored layer disposed thereon.

9. The electro-optical device of claim 7, wherein said transmitting portion is an opening provided on said reflective layer and comprises a light transmitting layer essentially capable of transmitting light between said reflective layer excluding said opening and said colored layer.

10. The electro-optical device of claim 9, wherein said transmitting layer has scattering functions for scattering light.

11. The electro-optical device of claim 7, wherein said transmitting portion is an opening provided to said reflective layer, having a foundation layer between said reflective layer excluding said opening and said substrate.

12. The electro-optical device of claim 11, wherein the surface of said foundation layer has patterned indentations, and wherein said reflective layer has minute patterned indentations for scattering light.

13. The electro-optical device of claim 7, wherein a first colored layer disposed in a first pixel has a first color, and a second colored layer disposed in a second pixel adjacent to said first pixel has a second color different from said first color, and wherein a portion of each of said first colored layer and said second colored layer overlaps each other in the region between said first pixel and said second pixel, and said portion of said first colored layer extends away from said substrate.

* * * * *